United States Patent
Passot et al.

(10) Patent No.: US 12,164,299 B2
(45) Date of Patent: Dec. 10, 2024

(54) SYSTEMS AND METHODS FOR OPTIMIZING ROUTE PLANNING FOR TIGHT TURNS FOR ROBOTIC APPARATUSES

(71) Applicant: Brain Corporation, San Diego, CA (US)

(72) Inventors: Jean-Baptiste Passot, San Diego, CA (US); Michal Garmulewicz, San Diego, CA (US)

(73) Assignee: Brain Corporation, San Diego, CA (US)

( * ) Notice: Subject to any disclaimer, the term of this patent is extended or adjusted under 35 U.S.C. 154(b) by 343 days.

(21) Appl. No.: 17/149,951

(22) Filed: Jan. 15, 2021

(65) Prior Publication Data

US 2021/0132615 A1    May 6, 2021

Related U.S. Application Data

(63) Continuation of application No. PCT/US2019/041991, filed on Jul. 16, 2019.

(60) Provisional application No. 62/698,438, filed on Jul. 16, 2018.

(51) Int. Cl.
*G05D 1/00* (2024.01)
*G01C 21/34* (2006.01)

(52) U.S. Cl.
CPC ....... *G05D 1/0214* (2013.01); *G01C 21/3415* (2013.01)

(58) Field of Classification Search
CPC ......... G05D 1/0214; G05D 2201/0203; G05D 1/0217; G05D 1/0274; G05D 1/0088; G05D 1/0212; G01C 21/3415; G01C 21/3461; G01C 21/3407; B62D 15/0285; B25J 9/1666; B25J 9/1676; B25J 9/1671; G05B 2219/40515; G05B 2219/40308

See application file for complete search history.

(56) References Cited

U.S. PATENT DOCUMENTS

| | | |
|---|---|---|
| 2006/0095160 A1 | 5/2006 | Orita et al. |
| 2008/0059015 A1 | 3/2008 | Whittaker et al. |
| 2009/0326713 A1 | 12/2009 | Moriya |
| 2010/0106356 A1* | 4/2010 | Trepagnier ............. G01S 17/86 701/25 |
| 2014/0342834 A1 | 11/2014 | Tappeiner et al. |
| 2015/0100194 A1 | 4/2015 | Terada et al. |
| 2017/0080565 A1 | 3/2017 | Dalibard et al. |

(Continued)

OTHER PUBLICATIONS

International Search Report and Written Opinion dated Sep. 30, 2019 for PCT/US19/41991.

(Continued)

*Primary Examiner* — Bao Long T Nguyen
(74) *Attorney, Agent, or Firm* — Pierson Ferdinand LLP; Sidharth Kapoor

(57) ABSTRACT

Systems and methods for optimizing robotic route planning are disclosed in relation to autonomous navigation of sharp turns, narrow passageways, and/or a sharp turn into a narrow passageway. Robots navigating a route comprising any of the above run the risk of colliding with environment obstacles when executing these maneuvers. Accordingly, systems and methods for improving robotic route planning are necessary within the art and are disclosed herein.

20 Claims, 19 Drawing Sheets

(56) References Cited

U.S. PATENT DOCUMENTS

| | | |
|---|---|---|
| 2017/0351926 A1* | 12/2017 | Nagase ............. B60W 60/0016 |
| 2018/0059682 A1* | 3/2018 | Thode ................. B60W 30/095 |
| 2018/0120856 A1 | 5/2018 | Gabardos et al. |
| 2018/0173242 A1 | 6/2018 | Lalonde et al. |
| 2018/0181133 A1 | 6/2018 | Zhang et al. |
| 2019/0196480 A1* | 6/2019 | Taylor ................. G05D 1/0223 |

OTHER PUBLICATIONS

Supplementary European Search Report for EP 19837252, dated Mar. 4, 2022.

* cited by examiner

| Position Along Route | Original Path | | New Path | |
|---|---|---|---|---|
| | | | | |
| 1 | $X_1$ | $Y_1$ | $X_1+\Delta X_1$ | $Y_1+\Delta Y_1$ |
| 2 | $X_2$ | $Y_2$ | $X_2+\Delta X_2$ | $Y_2+\Delta Y_2$ |
| ... | ... | ... | ... | ... |
| N | $X_N$ | $Y_N$ | $X_N+\Delta X_N$ | $Y_N+\Delta Y_N$ |

FIG. 7

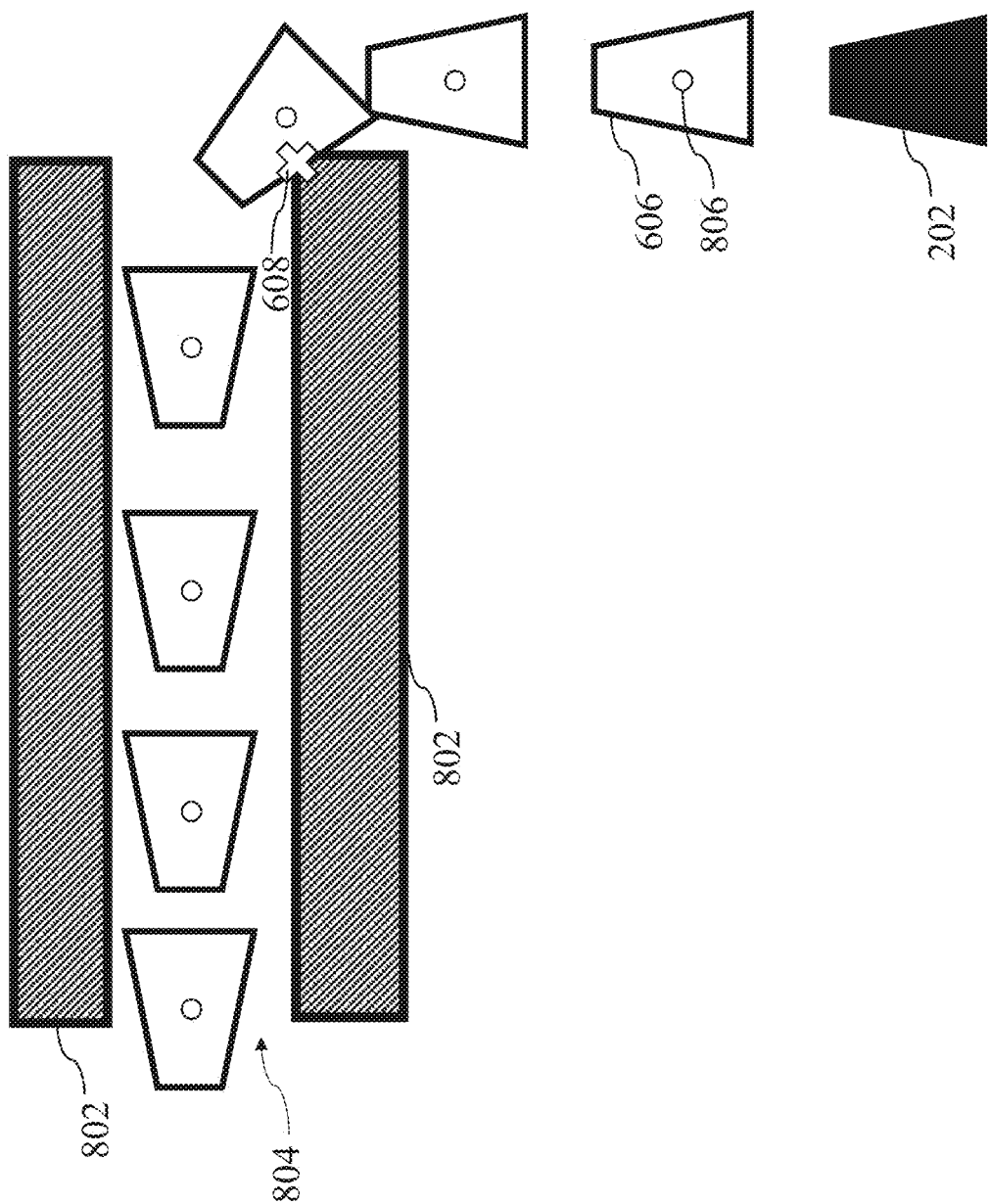

| Position Along Route | Side A | Side B | Determination |
|---|---|---|---|
| 1 | 1 | 0 | Object on side A |
| 2 | 0 | 0 | 0 |
| 3 | 1 | 1 | Narrow Passageway |
| 4 | 1 | 1 | Narrow Passageway |
| 5 | 0 | 1 | Object on side B |
| 6 | 0 | 0 | 0 |
| ... | ... | ... | ... |
| N | 0 | 0 | 0 |

FIG. 9D

SYSTEMS AND METHODS FOR OPTIMIZING ROUTE PLANNING FOR TIGHT TURNS FOR ROBOTIC APPARATUSES

This application is a continuation of International Patent Application No. PCT/US19/41991 filed Jul. 16, 2019 and claims the benefit of U.S. Provisional Patent Application Ser. No. 62/698,438 filed on Jul. 16, 2018 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for optimizing route planning for tight turns and/or narrow passageways for robotic apparatuses.

Background

Currently, some robots may autonomously navigate a route taught or pre-programmed into them by an operator or learned from a map given to them by an operator. These routes, when taught or pre-programmed to the robot by an operator, may not consider some parameters the robot may consider while operating autonomously such as turn radius, the current state of the wheels, sensor data, and/or tasks it accomplishes at specific locations. In some instances, a route may be provided to a robot without localizing objects nearby the route, wherein the route may potentially require optimizations if objects are later detected, during navigation of the route, substantially close to the route. In some instances, robots may learn the route by being moved manually, wherein some movements may not be repeatable during autonomous operation due to, for example, safety. These un-optimized routes may cause the robot to collide with objects or get stuck while traveling the route because the route learned by the robot may not be optimized for the robot.

Robotic floor cleaners are one example of a robot that navigates complex routes, which may comprise tight corners and narrow passageways making it difficult for the robot to navigate an un-optimized route learned by an operator. The physical dimensions and properties of a robot may inhibit its ability to navigate around corners and narrow passageways without collisions with objects in the environment. Accordingly, there is a need in the art for improved systems and methods for navigating a robot around tight corners and narrow passageways that are encountered by the robot during a traveled path.

SUMMARY

The foregoing needs are satisfied by the present disclosure, which provides for, inter alia, systems and methods for optimizing robotic route planning methods for tight turns for robotic apparatuses. One skilled in the art would appreciate that as used herein, the term robot may generally be referred to autonomous vehicle or object that travels a route, executes a task, or otherwise moves automatically upon executing or processing computer-readable instructions. According to some exemplary embodiments, the robot may comprise a floor cleaner navigating a route learned by an operator comprising tight corners and spaces.

Example implementations described herein have innovative features, no single one of which is indispensable or solely responsible for their desirable attributes. Without limiting the scope of the claims, some of the advantageous features will now be summarized.

According to at least one non-limiting exemplary embodiment, a method for changing to optimize robotic route planning is disclosed. In one non-limiting exemplary embodiment, this method includes: generating and/or receiving a map of the environment comprising the locations of known objects and a route to take by an autonomous vehicle, such as a robot, visualizing a plurality of possible future states and positions of the robot as it navigates the route, and optimizing some segments of the route, prior to the route travel, to avoid collisions. One skilled in the art would appreciate the future states may correspond to a state or position of the robotic apparatus in a future time such that the robotic apparatus may predict its position and/or location in a future point in time.

According to at least one non-limiting exemplary embodiment, the method further comprises, determining if the robot's future actions and states may lead to collision utilizing virtual robots, computing collision points, and elastic banding segments of the route to allow safe navigation of a robot around tight corners and into narrow passageways. According to another non-limiting exemplary embodiment, the robot may also consider state points along the route, which may be moved, removed, changed, and/or added along the route to account for changes after optimization. Stated differently, the robot avoids collision by utilizing, in-part, virtual robots, which are representative of the robot in the future or at a future location that the robot will travel, computing collision points along the route, and elastic banding segments of the route traveled by the robot.

According to at least one non-limiting exemplary embodiment, a robot may learn a route by following an operator during which the robot stores in memory any tight spaces or segments of the route which may require further optimization to be navigable in autonomous operation (i.e., future point in time). According to another non-limiting exemplary embodiment, the robot may perform optimizations to a route as it is learning it from an operator. According to another non-limiting exemplary embodiment, a robot may be given a computer-readable map and routes by an operator through wired or wireless connection wherein the robot may require further optimization of the route.

According to at least one non-limiting exemplary embodiment, a robot may use a plurality of virtual robots to test possible future routes for collisions with environmental barriers. According to at least one non-limiting exemplary embodiment, the virtual robot will predict a collision if the robot turns left, right, or moves forward. According to at least one non-limiting exemplary embodiment, the virtual robot may be used to find optimized routes by indicating to the robot when and/or where the robot may encounter a collision or get stuck. By doing such optimization of routes or paths that the robot may take in the future, the robot may potentially avoid the tight corners or narrow passageways that it will encounter along its travelled path, which robot will achieve by utilizing virtual robots computing collision points along the route, and elastic banding segments of the route traveled by the robot.

According to at least one non-limiting exemplary embodiment, a virtual robot may be larger than the robot it represents to allow for a margin of error during optimization. By way of non-limiting exemplary illustration, a robot may utilize footprints of virtual robots that are larger than itself to determine a route around specific objects known to require a larger margin of error, usually specified by an operator through a user interface, wired, or wireless communication.

According to at least one non-limiting exemplary embodiment, the robot may change or optimize a route by increasing the length of the route around corners to allow the robot to make a wider turn, thereby reducing the risk of collision or getting stuck by ensuring the robot in a certain orientation after completing the turn. According to another non-limiting exemplary embodiment, it may be desirable in the case of a robot navigating a tight corner into a narrow passageway that the robot, upon completing the turn, is aligned such that it may simply move forward through the passageway and avoid collisions associated with turning the robot near the passageway. By way of non-limiting exemplary embodiments, a robotic floor cleaner cleaning the aisles of a store may be required to navigate from one aisle to another wherein the robot may navigate a tight turn between the aisles into a narrow aisle.

According to at least one non-limiting exemplary embodiment, a method for changing or optimizing a route for a robot is disclosed. The method may be effectuated by one or more processors of the robot executing instructions from a non-transitory memory. The method comprises: determining a first route based on changing or optimizing a segment of a second route prior to the robotic system traveling the first route, the changing or optimizing being based on at least avoiding collision with objects while executing a maneuver of the second route, the first route being determined from at least one possible route corresponding to the changed or optimized segment of the second route. The method may further comprise superimposing footprints of at least one virtual robot on a computer-readable map to test the at least one possible route to determine the first route, wherein the at least one virtual robot footprints comprise a footprint indicative of future positions of the robotic system on the computer-readable map. The testing of the at least one possible route comprises determining collision points along the at least one possible route; the at least one collision point is determined where a footprint of the at least one virtual robot at least in part intersects or overlaps an object on the computer-readable map. The method may further comprise determining a degree of risk associated with each of the at least one possible route, wherein a higher degree of risk corresponds to the robotic system maneuvering closer to an object, and a lower degree of risk corresponds to the robotic system maneuvering farther away from the object. In some instances, the at least one possible route further comprises elastic banding the segment of the second route; the elastic banding comprises extending the second route away from an obstacle such that the elastic banded second route encompasses a wider turn around the obstacle. In some instances, navigation of the changed or optimized segment of the second route configures the robotic system to orient itself in a forward direction prior to entering a narrow passageway. The method may further comprise modifying at least one state point along the second route to account for an optimization made to the segment of the second route for the first route; the modifications comprise adding, removing, and repositioning the at least one state point, and modifying one or more state parameters corresponding to the at least one state point.

According to at least one non-limiting exemplary embodiment, a method for detecting a narrow passageway along a route of a robot is disclosed. The method comprising extending a footprint of the robot on a first side and a second side, the first and second sides being perpendicular to the forward direction of the robot and are on opposite sides of the robot; navigating a route and determining locations where objects overlap with the extended footprints on a computer-readable map; and determining a narrow passageway at locations where at least one pair of objects is detected on both the first and second sides of the robotic system. The method may further comprise use of one or more virtual robots comprising an extended footprint in place of the robotic system by projecting the one or more virtual robots along the route on the computer-readable map.

According to at least one non-limiting exemplary embodiment, a method for detecting a narrow passageway along a route of a robot is disclosed. The method comprises continuously detecting in real-time, using one or more sensors or a computer-readable map, two objects on opposite sides of a route at a distance from the route less than a predetermined distance threshold, the distance threshold being proportional to a size of the robot.

According to at least one non-limiting exemplary embodiment, a method for detecting sharp turns along a route of a robot is disclosed. The method may comprise continuously determining in real-time velocity vectors of the robot as the robot executes a turn, continuously measuring in real-time a rate of angular change of the velocity vectors over a predetermined distance along the route, and continuously comparing in real-time the rate of change to a threshold. The rate of change exceeding the threshold corresponds to one or more portions of the route requiring optimization.

These and other objects, features, and characteristics of the present disclosure, as well as the methods of operation and functions of the related elements, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 7 is an illustrative data table of changing a robot's first path with an optimized second path from memory.

FIGS. 8A-C are a top view illustration of changes to a robot's first path with an optimized second path according to an exemplary embodiment.

FIG. 9D is a data table comprising locations along a path of a robot and corresponding object detection readings according to an exemplary embodiment.

Figure 1:
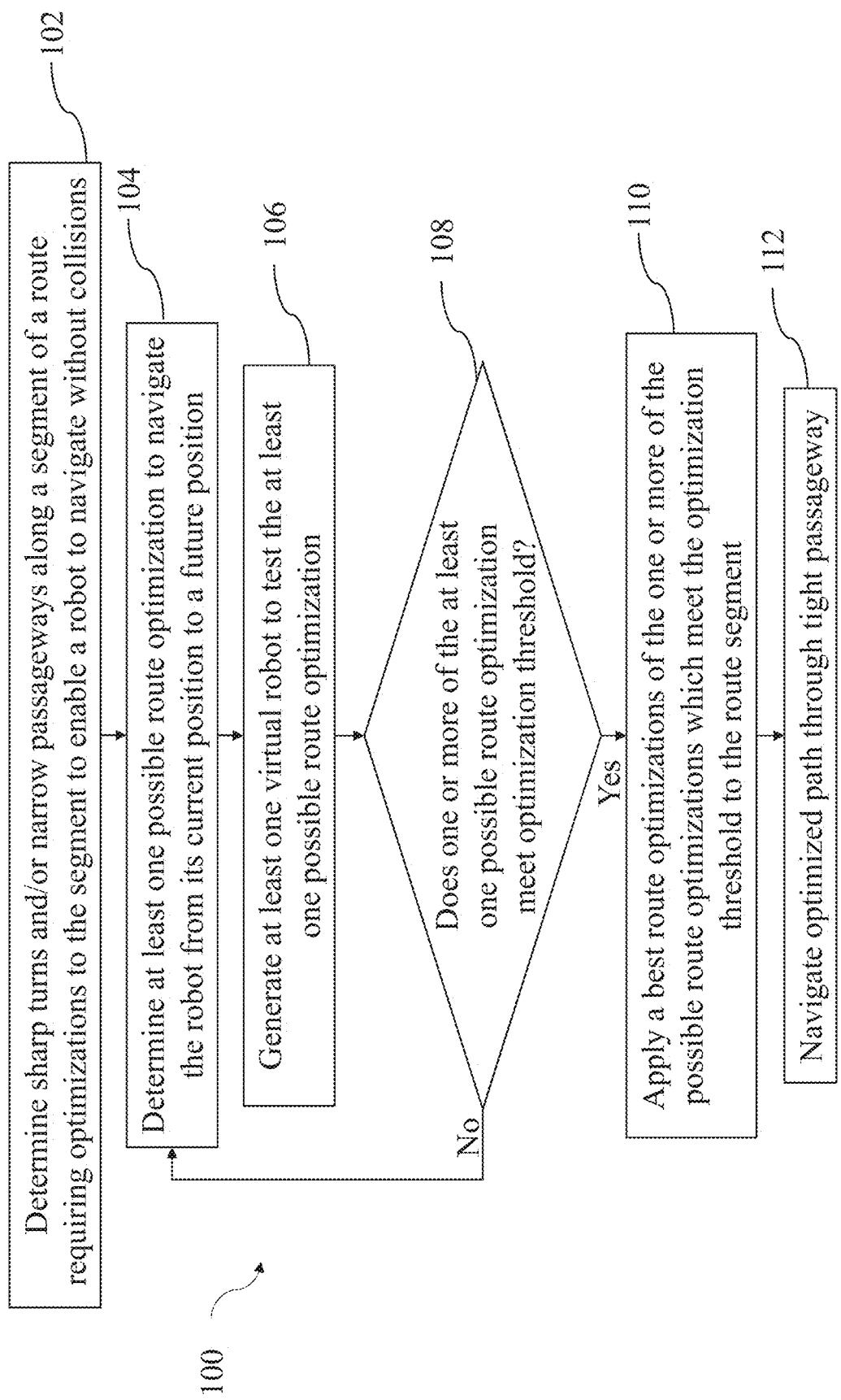
FIG. 1 is a process flow diagram of a method of a robot optimizing a route around a tight corner into a narrow passageway according to an exemplary embodiment.

All figures disclosed herein are © Copyright 2021 Brain Corporation. All rights reserved.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved methods of optimizing robotic route planning. Some embodiments of the present disclosure relate to robots. As used herein, a robot may include mechanical and/or virtual entities configured to carry out a complex series of actions automatically. In some cases, robots may be machines that are guided and/or instructed by computer programs, specialized algorithm, and/or electronic circuitry. In some cases, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another. In some cases, such robots used for cleaning may include robotic mobile platforms as the robots are mobile systems that may navigate and/or move autonomously and/or semi-autonomously.

Detailed descriptions of the various embodiments of the system and methods of the disclosure are now provided. While many examples discussed herein may refer to robotic floor cleaners, it will be appreciated that the described systems and methods contained herein are applicable to any kind of robot. Myriad other example embodiments or uses for the technology described herein would be readily envisaged by those having ordinary skill in the art, given the contents of the present disclosure.

Advantageously, the systems and methods of this disclosure at least: (i) allow robots to plan its course along at least one route in advance; (ii) allow robots to further optimize learned routes prior to traveling on the route; (iii) reduce collisions and the chances of robots getting stuck navigating the at least one route; and (iv) improving efficiency of robots operating autonomously by providing systems and methods for optimizing the at least one route.

As used herein, an obstacle may comprise, including, but not limited to, any object or barrier in the environment surrounding a robot wherein the robot may navigate the obstacle and avoid collision.

As used herein, a virtual robot may comprise, including, but not limited to, any projection, mapping, and/or superposition of the robot in a future location, future location corresponding to location of the robot in a future point of time as the robot travels along a routed path. According to at least one non-limiting embodiment a virtual robot may also comprise footprint indices, stored in memory by a specialized processing apparatus, wherein the footprint indices comprise parameters of the robot (e.g., size, shape, etc.) in a future location. According to another non-limiting exemplary embodiment, the footprint indices may comprise different parameters to account for a margin of error.

As used herein, a sharp turn may comprise, including, but not limited to, any turn along a pre-planned or new route, wherein a robot experiences collision with obstacles as it navigates the turn due to physical properties of the robot including, but not limited to, size, shape, turn radius, and/or any other physical property of the robot. According to at least one exemplary embodiment, a robot may determine which segments of a route comprise a sharp turn and/or narrow passageway by the detection of collision points along a route, using a virtual robot, and/or a turn exceeding a set threshold (e.g., including, but not limited to, 60 degrees within 1 meter).

As used herein, a robot optimizing a route may comprise, including, but not limited to, a robot making changes to some or all of the segments along the route such that the robot may traverse the optimized route autonomously with minimal risk of collision and/or getting stuck along a traveled path. Additionally, an optimized route is the most efficient route the robot may travel out of a plurality of possible routes.

As used herein, a portion or segment of a route may comprise any length of the route. For example, a segment of a route may comprise a 1, 2, 3, etc. meter section of the route.

As used herein, a state point may comprise a location along a route of a robot and a corresponding state for the robot at the location (e.g., position, orientation, speed, actuator commands, etc.). According to a non-limiting exemplary embodiment, the state points are stored within the memory of a robot and may assist in navigating the robot, ensuring the robot is traversing its route correctly, and/or ensure the robot performs a specific task at a desired or given state point along the travelled path. According to an exemplary embodiment, there may be a plurality of desired or given points at set or predetermined locations along the route.

As used herein, the method of elastic banding a path or segment of a path may comprise stretching and/or elongating the path or segment of the path to encompass a wider turn radius around a narrow corner or object in order to increase distance between a robot and an object as the robot makes the turn such that the robot avoids collision or contact with the object. Further, elastic banding the path or segment of the path may configure a robot to orient itself in a substantially forward orientation upon navigation of the elastic banded path or path segment into a narrow passageway. According to at least one non-limiting exemplary embodiment, a robot may elastic band a segment of a path around one or more objects by determining a minimum distance between the robot and the one or more objects to be maintained while the robot navigates around the one or more objects along the path.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software may include, but are not limited to, any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include, but are not limited to, a causal link between any two or more entities (whether physical or logical/virtual), which enables information exchange between the entities.

According to a first non-limiting exemplary embodiment, a robotic system is disclosed, which may comprise or be coupled with at least one sensor, at least one navigation system or global positioning system, at least one actuator, at least one communications system, map evaluation units, at least one processor, at least one non-transitory computer-readable storage device, and/or power supply units which may use some, none or all for navigating routes autonomously.

According to a second non-limiting exemplary embodiment, a method for optimizing robotic route planning is disclosed. According to such embodiment, a robot is given a computer-readable map of an environment through wired or wireless communication comprising the locations of known obstacles and routes it may follow. According to another non-limiting exemplary embodiment, the robot may learn routes and map out its environment by following an operator. These routes may not be navigable by a robot operating fully autonomously and/or may not be the most optimal route requiring a specialized processor, executing instructions from a non-transitory computer-readable storage device, to generate optimizations for some or all of the routes.

According to at least one non-limiting embodiment, a route taught to a robot by an operator, or communicated to the robot through wired or wireless communication, may not be navigable by the robot while the robot is operating completely autonomously. By means of illustrative example, the learned route may comprise tight corners, narrow passageways, and/or other obstacles, which the robot is able to navigate by following an operator through the route but cannot navigate completely autonomously. According to another non-limiting exemplary embodiment, an optimized route may be taught directly to a robot wherein the robot may use the systems and methods of the present disclosure to verify the route are optimized. One skilled in the art would appreciate that the robot being taught to perform a desired action corresponds to the operator programming the robot through specialized code stored in the memory of the robot, which is executed by a specialized processor included in the robot.

According to at least one non-limiting exemplary embodiment, the optimized route may be later re-optimized to account for changes in the environment over time (e.g., additional obstacles, rearrangement of known obstacles, etc.).

According to another non-limiting exemplary embodiment, a non-transitory computer-readable storage device is disclosed. The non-transitory computer-readable storage device has a plurality of instructions stored thereon, the instructions being executable by a specialized processing apparatus to operate a robot and optimize its routes.

According to another non-limiting embodiment, the non-transitory computer readable storage device may include instructions that, when executed by a specialized processing apparatus, cause the robot to generate a plurality of virtual robots to test future routes. These virtual robots generate footprint indices of future locations of a robot, which are stored in memory by a specialized processor. According to another non-limiting embodiment, the footprint indices stored in memory may comprise coordinate locations of virtual robots on a computer-readable map of an environment, the space they occupy, and/or any state (e.g., position, rotation, current action, etc.) of the virtual robots. The footprint indices may further be stored in memory using a plurality of data structures such as arrays, matrices, and any other data structure considered to be readily apparent to one of ordinary skill in the art.

According to another non-limiting embodiment, the non-transitory computer-readable storage device may include instructions that, when executed by a specialized processing apparatus, predict future collisions by imposing the footprint indices generated by the virtual robots on a computer-readable map, stored in memory, of the environment and/or location of known obstacles. Data gathered by imposing virtual robots onto an environment may be used to further optimize a route by avoiding all possible routes where a footprint of a virtual robot touches or overlaps with an obstacle in the environment, indicative of a future collision.

According to at least one non-limiting exemplary embodiment, the non-transitory computer-readable storage device may include instructions that, when executed by a specialized processing apparatus, cause the processor to perform risk analysis associated with the position of the robot and virtual robots, determine possible routes for mitigating the risks, and choosing the most optimal route for the robot to follow based at least in part on the risk analysis.

According to at least one non-limiting exemplary embodiment, a specialized processor may utilize the method of elastic banding a segment of a route to allow the robot to navigate a tight corner into a narrow passageway. The degree to which a route or segment of a route is elastic banded may be due at least in part to the physical properties of the robot (e.g., size, shape, and/or turn radius of the robot) and the parameters of the environment (e.g., additional obstacles, size of obstacles, shape of obstacles, etc.). Additionally, according to at least one exemplary embodiment, the degree to which a route or segment of a route is elastic banded may also be due, at least in part, to minimizing risk associated with maneuvering a robot at certain distances from objects. Performing a wider turn around a narrow corner may allow a robot to avoid collisions and navigate into a narrow passageway after the turn is completed.

According to another non-limiting embodiment, the non-transitory computer-readable storage device may include instructions that, when executed by a specialized processing apparatus, adjust the location of one or multiple state points along a route to account for changes made to the route, ensuring the robot is in a specified state at the same location before and after the optimizations to the route were made. By means of a non-limiting illustrative example, a robot may change when a state point is reached (e.g., by bit-shifting in memory, zero padding in memory, adding/removing other state points, changing time to reach state point, changing distance previous state point, etc.) to account for a longer or shorter route after optimizations are made. According to another non-limiting exemplary embodiment, the state and location corresponding to a state point may be maintained at the same location before and after the route was optimized. Similarly, according to another non-limiting exemplary embodiment, a state point and corresponding state may be added, removed, and/or changed to account for optimizations to the route.

As another example, the systems and methods of the present disclosure may allow for use of robotics with relatively few or no modifications to an environment. Certain contemporary solutions involving robots may require users to install rails, beacons, markers, lines, and/or cues for the robot to navigate. In some cases, such installations may be costly from a time, money, and/or aesthetic perspective. Such installations may also cost/require resources to maintain. Moreover, the installations may create failure points in robotic solutions, causing at least a portion of the solution to fail if one or more aspects of the installations do not operate as intended. Advantageously, the systems and methods of this disclosure may allow robotics to rely on relatively few or no installations in some instances. Yet, in some instances, changes to the environment may be made in accordance with aspects of this disclosure in order to enhance efficiency and work flow.

Figure 9A:
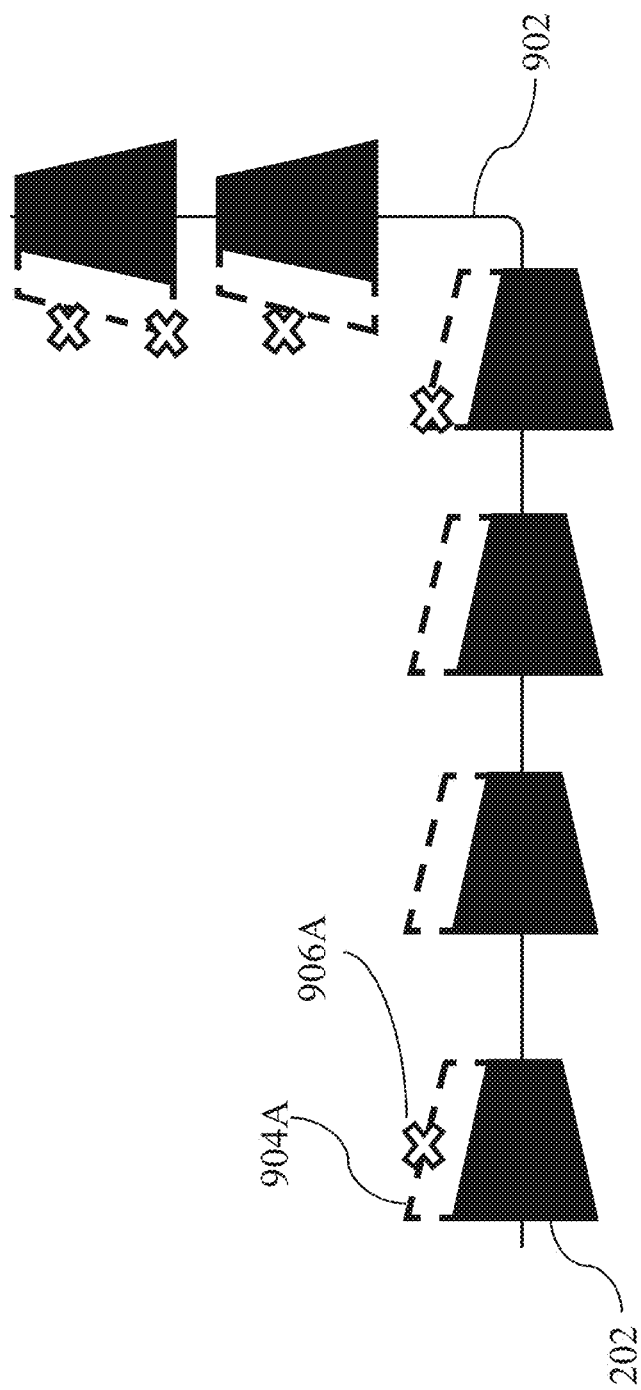
FIGS. 9A-B are a top view illustration of a robot mapping out possible collision points along a route on either side of the robot using an extended footprint on either side of the robot according to an exemplary embodiment.
Figure 9B:
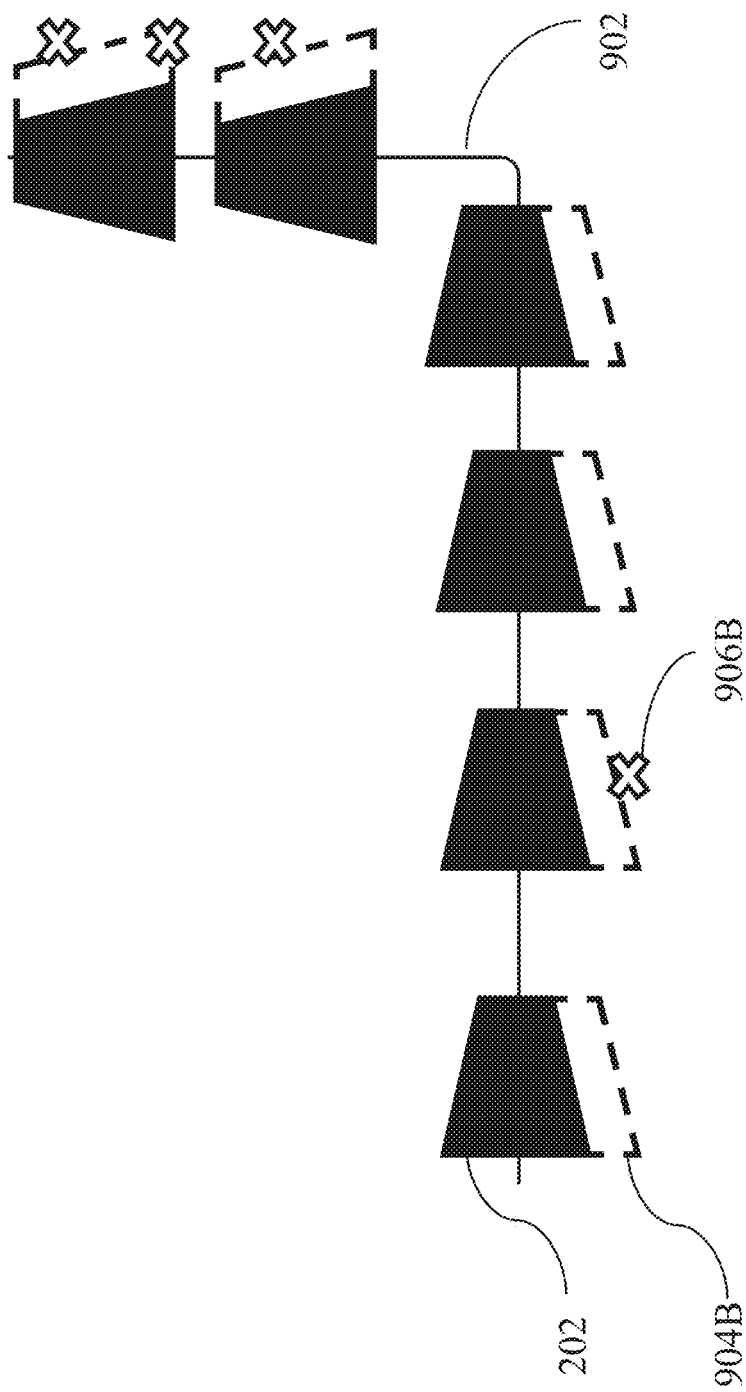
Figure 9C:
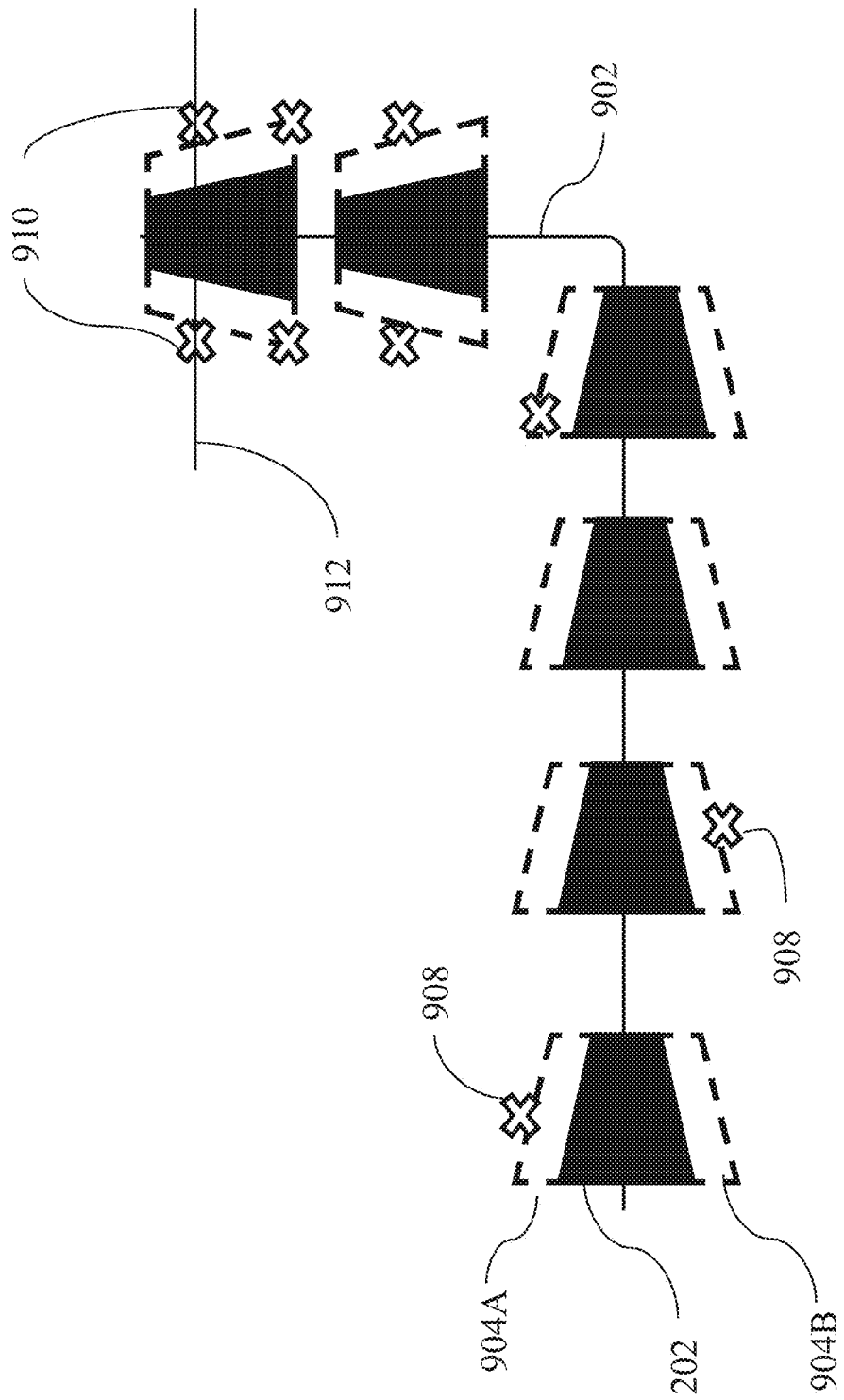
FIG. 9C is a top view illustration of a map of an environment comprising all possible collision points with the extended footprint, as illustrated in FIGS. 9A-9B, for determination of a narrow passageway along a route according to an exemplary embodiment.
Figure 10:
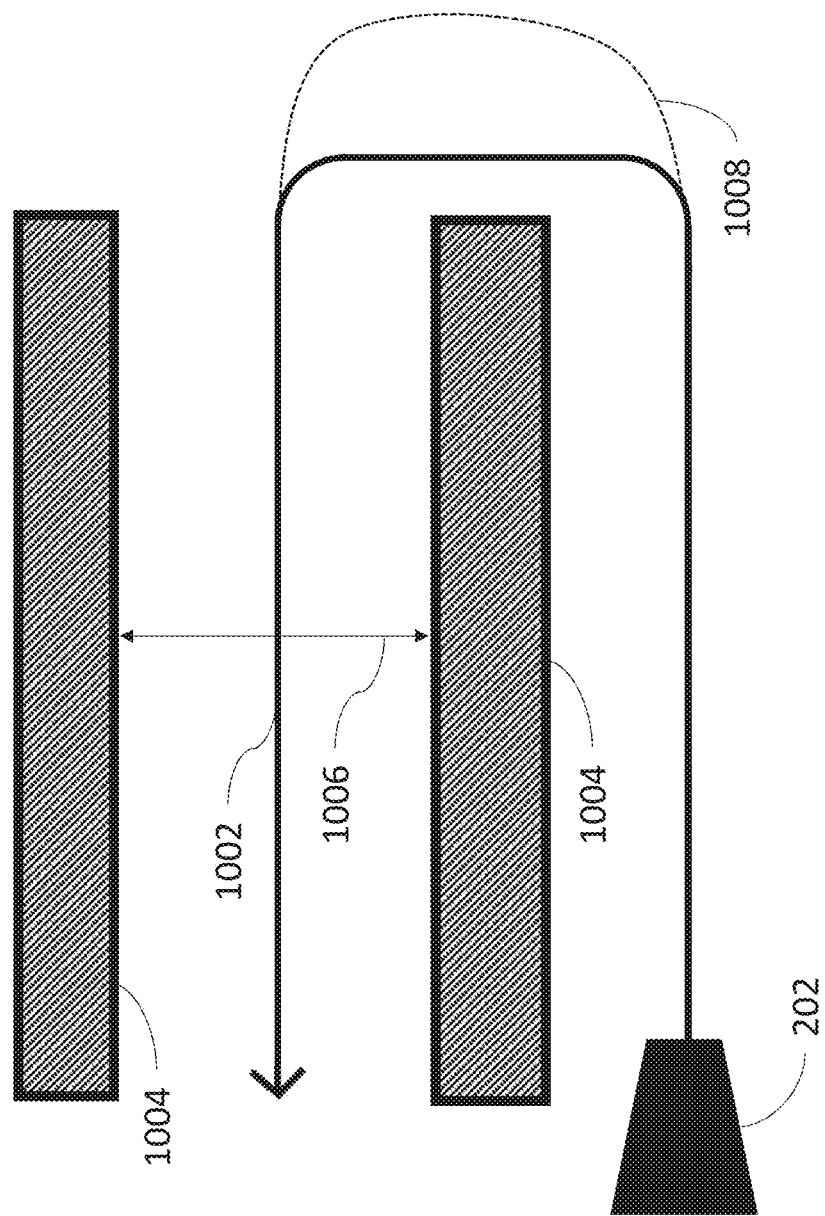
FIG. 10 is a top view of a robot navigating a route and detecting a narrow passageway, thereby requiring optimizations to the route, according to an exemplary embodiment.

FIG. 1 is a process flow diagram of an exemplary method 100 of a robot 202 detecting or determining a route that includes at least one tight turn into narrow passageway and optimizing that route. One skilled in the art would understand a tight turn may correspond to a turn the robot 202 is prevented from making autonomously without colliding with objects in its path or navigating too close to the objects (e.g., in accordance with areas 402 illustrated in FIG. 4 below). Block 102 illustrates a controller 222 or processor 308 executing computer-readable instructions to determine if a current route of robot 202 contains sharp turns and/or narrow passageways using methods further illustrated with respect to FIGS. 6, 8A-8B, 9A-D, and 10 as discussed below. Briefly, sharp turns may be detected on a portion of a route based on an angular rate of change of the portion of the route exceeding a threshold value. Narrow passageways may be determined geometrically (e.g., based on a distance threshold and measurements on a computer-readable map, as illustrated in FIG. 10 below) and/or using extended footprints of robot 202 (e.g., as illustrated in FIGS. 9A-C below).

Block 104 illustrates controller 222 or processor 308 executing computer-readable instructions to determine at least one possible route optimization to navigate robot 202 from its current position to a future or further position along the route, wherein the route to be optimized comprises one or more tight turns and/or narrow passageways detected in block 102. Future position of the robot 202 along the route corresponds to position of the robot 202 at a future point in time during navigation of the route.

Figure 6:
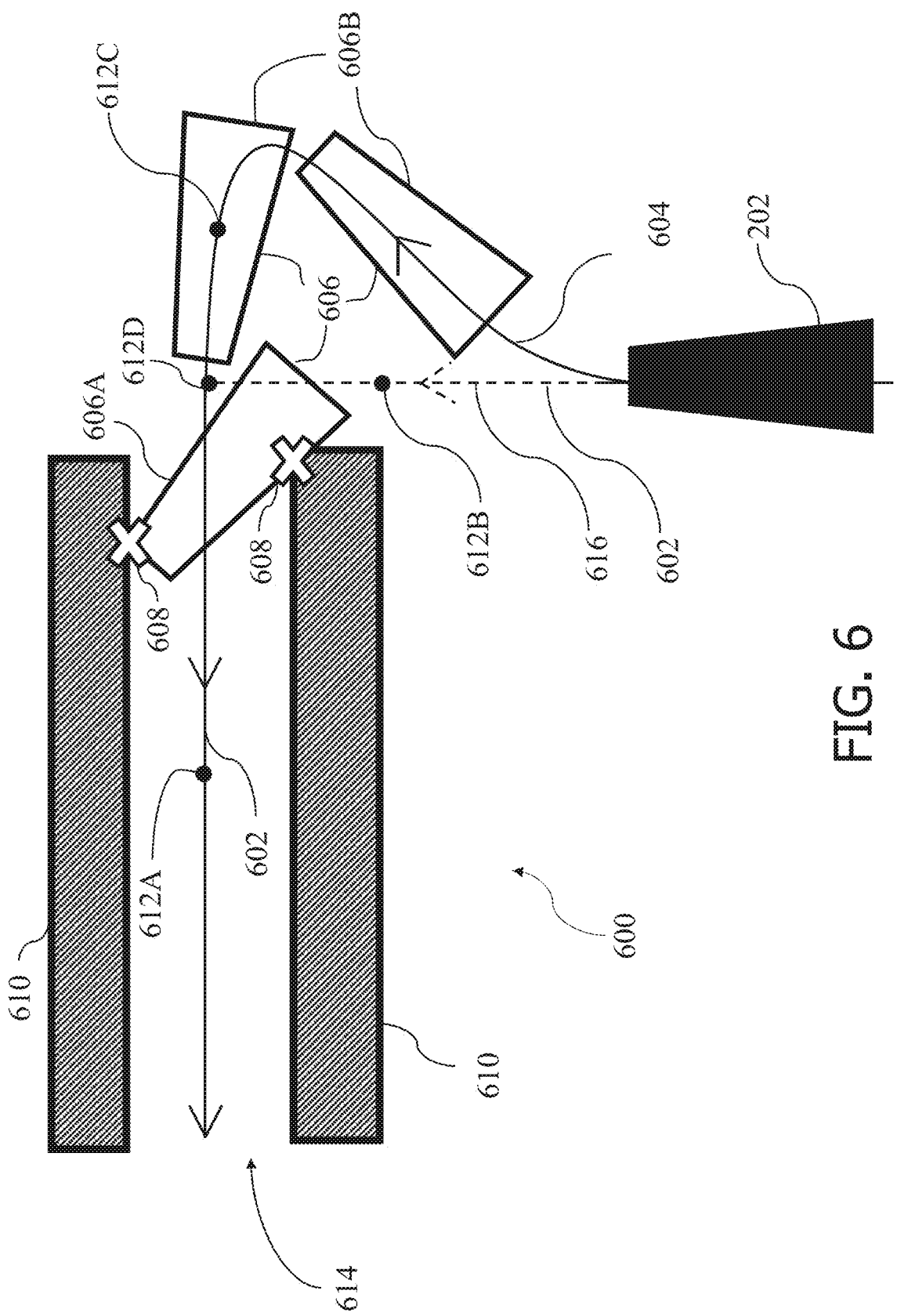
FIG. 6 is a top view illustration of a robot utilizing virtual robots to optimize a route comprising a sharp turn into a narrow passageway according to an exemplary embodiment.

According to at least one non-limiting exemplary embodiment, controller 222 or processor 308 executing computer readable instructions to determine a plurality of possible route optimizations near sharp turns and/or tight passageways. The plurality of optimizations determined near a sharp turn and/or narrow passageway may comprise elastic banding a segment of the original route such that a wider turn is taken by the virtual robots 606, as shown in FIG. 6, for example, to ensure no collision occurs as robot 202 later navigates the route. Again, one skilled in the art would recognize that virtual robots correspond to position of the robot 202 in a future point in time when the robot 202 is traveling along a desired path, the virtual robots being generated by the controller 118 projecting the virtual robots (i.e., a footprint of the robot 202) onto a computer-readable map ahead of the robot 102 along the route.

Block 106 illustrates controller 222 or processor 308 executing instructions stored on memory 224, illustrated in later FIG. 2, to generate at least one virtual robot 606 to test the at least one possible route optimization found in block 104. Using these virtual robots 606, controller 222 or processor 308 executes computer-readable instructions to compute possible collision points 608, further illustrated in FIG. 6, by the intersection of a virtual robot footprint with objects/boundaries 610 of the environment on the computer-readable map.

According at least one non-limiting exemplary embodiment, controller 222 or processor 308 executes computer readable instructions to utilize additional operative units 204 to impose the footprint indices of virtual robots 606 onto a computer-readable map of the environment, and further execute computer-readable instructions to store the footprint indices in memory 224, and test a plurality of routes for future collisions, the environment corresponding to the environment in which the robot 202 travels along a route.

Block 108 illustrates controller 222 or processor 308 executing computer-readable instructions stored on memory 224, illustrated below in FIG. 2, to determine if one or more of the at least one possible route optimization tested in block 106 meets an optimization threshold. According to at least one non-limiting exemplary embodiment the optimization threshold may comprise parameters including, but not limited to, a maximum number of allowable collision points 608 (e.g., zero collision points), a degree of risk parameter (further illustrated below in FIG. 4), and/or parameters relating additional route length of the optimized segment. By way of illustrative non-limiting embodiment, an exemplary optimization threshold may comprise zero collision points 608, a medium-risk tolerance, and a limit to how much an original route may be lengthened to account for optimizations made (e.g., no more than 2 meters, centimeters, inches, etc. may be added throughout the route). The optimization threshold may be set by a user through a user interface unit 212 and/or communicated by wired or wireless communication using communication units 216, illustrated below in FIG. 2. As illustrated in block 108, if one or more of the possible route optimizations does not meet the optimization threshold, controller 222 or processor 308 executes computer-readable instructions to go back to block 104 to determine another at least one possible route optimization. However, if the optimization threshold is met by one or more of the potential route optimizations tested in block 106, controller 222 or processor 308 executing computer-readable instructions to go to block 110, as illustrated in FIG. 1. It is appreciated that potential route optimizations which do not meet the optimization threshold may be disregarded by controller 222 or processor 308.

Block 110 illustrates a controller 222 or processor 308 executing computer-readable instructions to an optimal or best optimization of the one or more potential optimizations to the original route determined in block 104, tested in block 106, and meet the optimization threshold of block 108. The optimal or best optimization may comprise an optimization of the route comprising, for example, a lowest degree of risk, a minimum of additional route length added, and/or other parameters appreciated by one skilled in the art. According to at least one non-limiting exemplary embodiment, the application of the best route optimization to the original 602 may be done by modifying coordinates associated with state points along a route stored in memory 224, further illustrated in FIGS. 7 and 8A-C.

Block 112 illustrates controller 222 or processor 308 executing computer readable instructions to activate actuator units 208, illustrated below in FIG. 2, to move robot 202 along the optimized route, comprising the optimized segment or portion thereof, such that robot 202 is able to through tight turns and/or narrow passages without colliding with nearby objects, the optimized route being different, at least in part, from the original route due to the optimizations.

Figure 2:
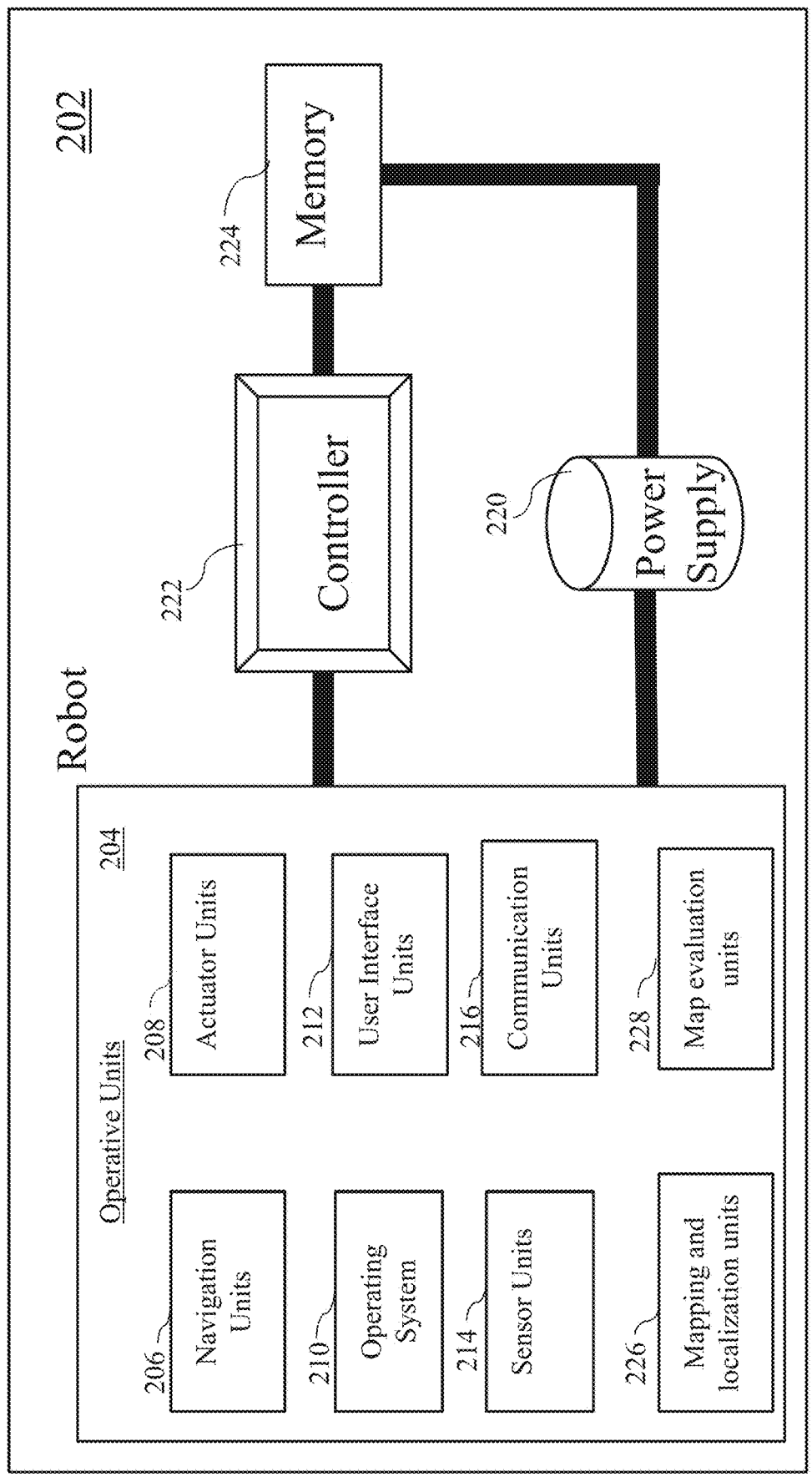
FIG. 2 is a functional block diagram of a robot in accordance with some implementations of this disclosure.

FIG. 2 is a functional block diagram of a robot 202 in accordance with some principles of this disclosure. As illustrated in FIG. 2, robot 202 may include controller 222, memory 224, user interface unit 212, mapping and localization unit 226, sensor units 214, actuator unit 208, and communications unit 216, as well as other components and subcomponents (e.g., some of which may not be illustrated). Although a specific implementation is illustrated in FIG. 2, it is appreciated that the architecture may be varied in certain embodiments as would be readily apparent to one of ordinary skill given the contents of the present disclosure. As used herein, robot 202 may be representative at least in part of any robot described in this disclosure.

Controller 222 may control the various operations performed by robot 202. Controller 222 may include and/or comprise one or more processors (e.g., microprocessors) and other peripherals. As used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 222 may be operatively and/or communicatively coupled to memory 224. Memory 224 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 224 may provide instructions and data to controller 222. For example, memory 224 may be a non-transitory, computer-readable storage apparatus and/or medium having a plurality of instructions stored thereon, the instructions being executable by a processing apparatus (e.g., controller 222) to operate robot 202. In some cases, the instructions may be configured to, when executed by the processing apparatus, cause the processing apparatus to perform the various methods, features, and/or functionality described in this disclosure. Accordingly, controller 222 may perform logical and/or arithmetic operations based on program instructions stored within memory 224. In some cases, the instructions and/or data of memory 224 may be stored in a combination of hardware, some located locally within robot 202, and some located remotely from robot 202 (e.g., in a cloud, server, network, etc.).

It should be readily apparent to one of ordinary skill in the art that a processor may be external to robot 402 and be communicatively coupled to controller 422 of robot 402 utilizing communications units 414 wherein the external processor may be configured to receive data from robot 402, process data, and transmit computer-readable instructions back to controller 422. In at least one non-limiting exemplary embodiment, the processor may be on a remote server (not shown).

According to at least one exemplary embodiment, sensor units 214 may comprise systems and/or methods that may detect characteristics within and/or around robot 202. Sensor units 214 may comprise a plurality and/or a combination of sensors. Sensor units 214 may include sensors that are internal to robot 202 or external, and/or have components that are partially internal and/or partially external. In some cases, sensor units 214 may include one or more exteroceptive sensors, such as sonars, light detection and ranging ("LIDAR") sensors, radars, lasers, cameras, including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to at least one exemplary embodiment, sensor units 214 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 214 may generate data based at least in part on measurements. Such data may be stored in data structures, such as matrices, arrays, queues, lists, arrays, stacks, bags, etc. According to at least one exemplary embodiment, the data structure of the sensor data may be called an image.

According to at least one exemplary embodiment, sensor units 214 may include sensors that may measure internal characteristics of robot 202. For example, sensor units 214 may measure temperature, power levels, statuses, and/or any characteristic of robot 202. In some cases, sensor units 214 may be configured to determine the odometry of robot 202. For example, sensor units 214 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 202. This odometry may include robot 202's position (e.g., where position may include robot's location, displacement and/or orientation, and may sometimes be interchangeable with the term "pose" as used herein) relative to the initial location. Such data may be stored in data structures, such as matrices, arrays, queues, lists, arrays, stacks, bags, etc. According to at least one exemplary embodiment, the data structure of the sensor data may be called an image.

Mapping and localization unit 226 may receive sensor data from sensor units 214 to localize robot 202 in a map. According to at least one exemplary embodiment, mapping and localization unit 226 may include localization systems and methods that allow robot 202 to localize itself in the coordinates of a map and/or relative to a location (e.g., an initialization location, end location, beacon, reference point, etc.). Mapping and localization unit 226 may also process measurements taken by robot 202, such as by generating a graph and/or map. According to at least one exemplary embodiment, mapping and localization unit 226 may not be a separate unit, but rather a portion of sensor units 214 and/or controller 222.

According to at least one exemplary embodiment, robot 202 may map and learn routes through a learning process. For example, an operator may teach robot 202 where to travel in an environment by driving robot 202 along a route in an environment. Through a combination of sensor data from sensor units 214, robot 202 may determine robot 202's relative poses and the poses of items in the environment. In this way, robot 202 may determine where it is in an environment and where it has travelled. Robot 202 may later recall where it travelled and travel in a substantially similar way (though it may avoid certain obstacles in subsequent travels). Robots may share such experiences with each other, such as through network 302.

According to at least one exemplary embodiment, user interface unit 212 may be configured to enable a user to interact with robot 202. For example, user interface unit 212 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable media), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to at least one exemplary embodiment, user interface unit 212 may be positioned on the body of robot 202. According to at least one exemplary embodiment, user interface unit 212 may be positioned away from the body of robot 202, but may be communicatively coupled to robot 202 (e.g., via communication units including transmitters, receivers, and/or transceivers) directly or indirectly (e.g., through a network, server, and/or a cloud). According to at least one exemplary embodiment, user interface unit may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

By way of illustration, robot 202 may have a projector, lights, and/or other projection systems. Robot 202 may project an image on the floor to let people know the direction of movements and/or the next action. For example, robot 202 may project an image of a path onto the floor to let people know where it will be traveling. Other images projected on the floor may indicate to people where robot 202 plans to stop, when it plans to start moving, where it moves, and/or useful information to make people around the robotic chair feel more comfortable and safe. Such projections may utilize substantially similar systems and methods as U.S. Patent Publication No. 2016/0375592, entitled "APPARATUS AND METHODS FOR SAFE NAVIGATION OF ROBOTIC DEVICES," now U.S. Pat. No. 9,840,003, which is hereby incorporated herein by reference in its entirety.

According to at least one exemplary embodiment, communications unit 216 may include one or more receivers, transmitters, and/or transceivers. Communications unit 216 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long-term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11a/b/g/n/ac/ad/af/ah/ai/aj/aq/ax/ay), and/or other wireless standards.

Communications unit 216 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 216 to communicate to external systems, such as computers, smart phones, tablets, data capture systems, mobile telecommunications networks, clouds, servers, or the like. Communications unit 216 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 216 may be configured to send and receive statuses, commands, and other data/information. For example, communications unit 216 may communicate with a user operator to allow the user to control robot 202.

Communications unit 216 may communicate with a server/network (e.g., a network) in order to allow robot 202 to send data, statuses, commands, and other communications to the server. The server may also be communicatively coupled to computer(s) and/or device(s) that may be used to monitor and/or control robot 202 remotely. Communications unit 216 may also receive updates (e.g., firmware or data updates), data, statuses, commands, and other communications from a server for robot 202.

Actuator unit 208 may include any system used for actuating, in some cases to perform tasks. For example, actuator unit 208 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to at least one exemplary embodiment, actuator unit 208 may include systems that allow movement of robot 202, such as motorized propulsion. For example, motorized propulsion may move robot 202 in a forward or backward direction, and/or be used at least in part in turning robot 202 (e.g., left, right, and/or any other direction). By way of illustration, actuator unit 208 may control if robot 202 is moving or is stopped and/or allow robot 202 to navigate from one location to another location.

Still referring to FIG. 2, mapping and localization units 226 may store, manipulate, and/or calculate computer-readable maps of an environment surrounding robot 202 based on data from one or more sensor units 214. For example, mapping and localization units 226 may receive LiDAR data from a LiDAR sensor, the LiDAR data comprising distance measurements between robot 202 and nearby objects, and map objects detected in the LiDAR data on a computer-readable map. A computer-readable map may comprise a representation of an environment surrounding a robot 202 including locations of objects, features, robot 202, and/or other localized objects or things. Mapping and localization units 226 may further be configured to localize robot 202 within an environment and/or on a computer-readable map based on measurements from one or more sensor units 214 (e.g., gyroscopes, accelerometers, and other IMUs).

Figure 4:
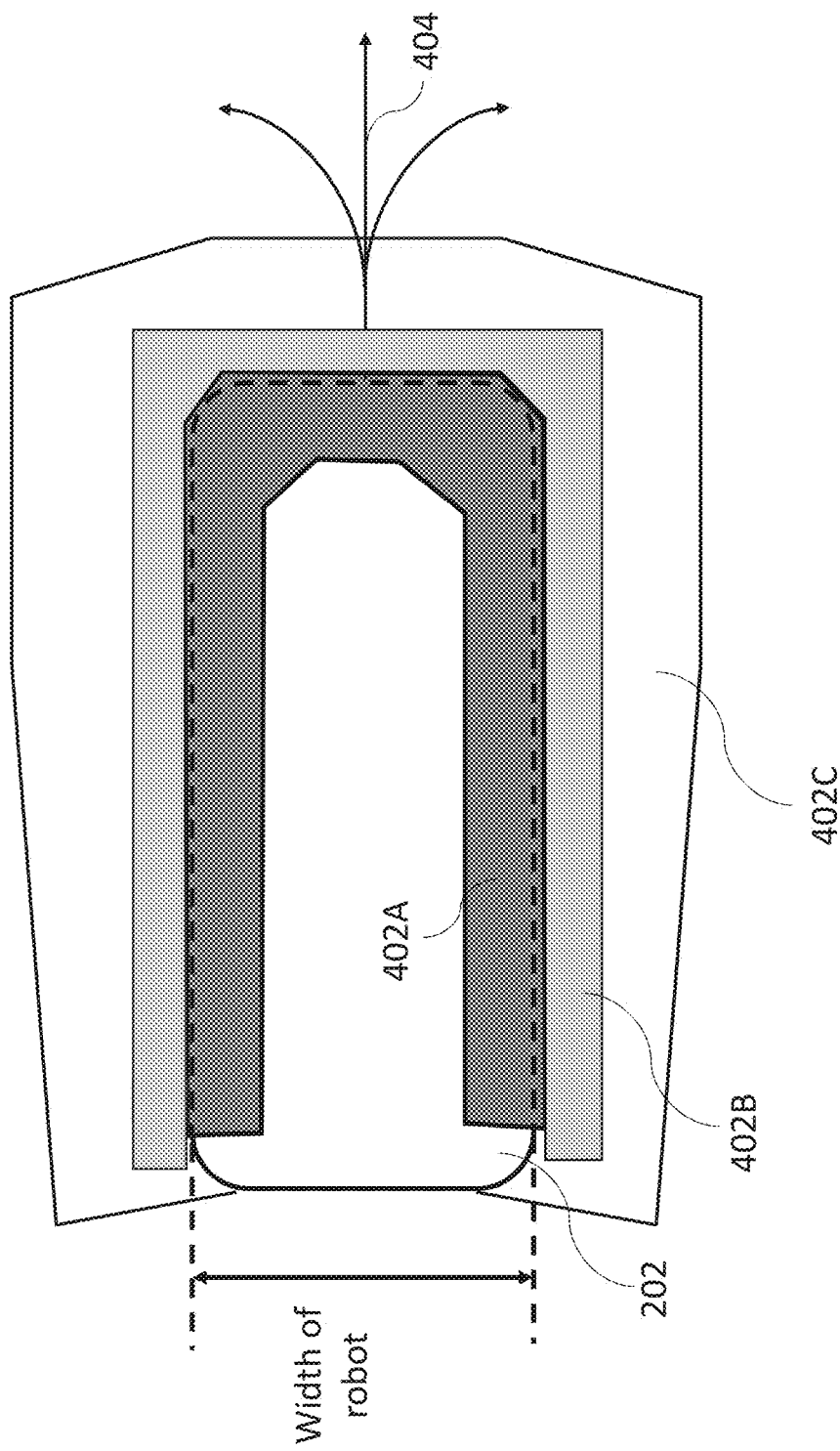
FIG. 4 is a top view illustration of a plurality of risk zones surrounding a robot according to an exemplary embodiment.

Map evaluation units 228 may be configured to evaluate computer-readable maps for accuracy and/or cost and risk evaluation, described further in FIG. 4 below. Map evaluation units 228 may evaluate, among other things, potential narrow passageways between two objects on a computer-readable map based on two objects being within a threshold distance on both sides of a navigable route for robot 202. Map evaluation units 228 may evaluate potential routes for robot 202 based on computer-readable maps to determine if the potential routes comprise unnavigable portions, tight corners, narrow passageways, and/or other hazards for robot 202 to consider during navigation. Map evaluation units 228 may be configured to determine if computer-readable maps of an environment accurately represent the environment based on measurements by sensor units 214. That is, map evaluation units 228 may manipulate preexisting computer readable maps to enhance accuracy based on acquired measurements from sensor units 214 as robot 202 operates.

One or more of the units described with respect to FIG. 2 (including memory 224, controller 222, sensor units 214, user interface unit 212, actuator unit 208, communications unit 216, mapping and localization unit 226, and/or other units) may be integrated onto robot 202, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 202 may be instantiated in a module that may be attached to an existing apparatus and/or integrated onto robot 202 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, it is understood by one of ordinary skill in the art that functions of robot 202 are controlled by controller 222 executing computer-readable instructions from memory 224, wherein controller 222 and memory 224 are communicatively coupled and may be internal or external (e.g., on a remote server) to robot 202. In other words, a controller performing a function requiring reading or writing to memory 224 comprises the controller executing the instructions from memory 224.

Figure 3:
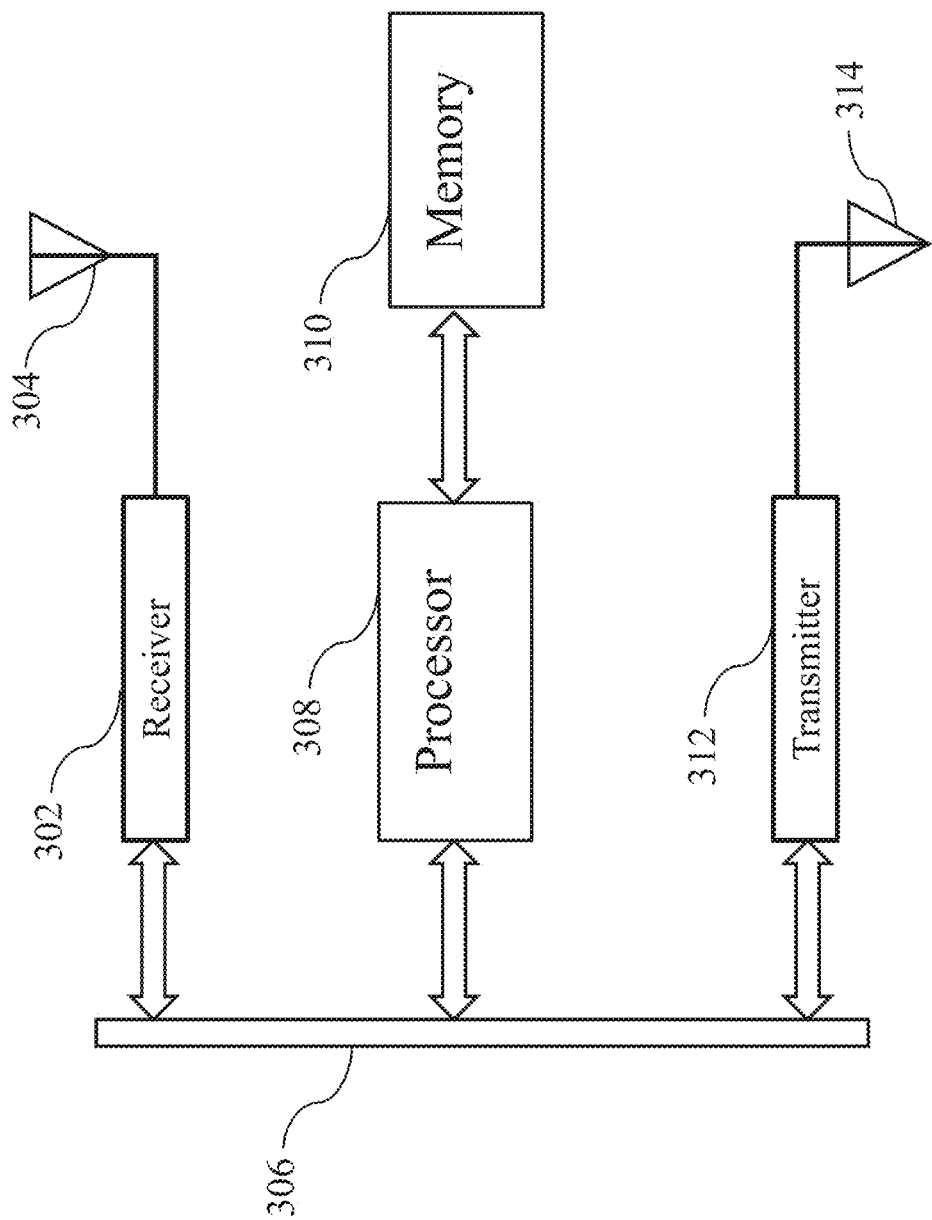
FIG. 3 is a functional block diagram of a specialized controller in accordance with some implementations of this disclosure.

Next referring to FIG. 3, the architecture of the specialized controller 222 used in the system shown in FIG. 2 is illustrated according to an exemplary embodiment. As represented in FIG. 3, the specialized controller 222 includes a data bus 306, a receiver 302, a transmitter 312, at least one processor 308, and a memory 310. The receiver 302, the processor 308 and the transmitter 312 all communicate with each other via data bus 306. The processor 308 is a specialized processor configured to execute specialized algorithms. The processor 308 is configured to access the memory 310, which stores computer code or instructions in order for the processor 308 to execute the specialized algorithms. As illustrated in FIG. 3, memory 310 may comprise some, none, different, or all of the features of memory 224 previously illustrated in FIG. 2. The algorithms executed by the processor 308 are discussed in further detail below. The receiver 302 as shown in FIG. 3 is configured to receive input signals 304. The input signals 304 may comprise signals from a plurality of operative units 204 illustrated in FIG. 2 including, but not limited to, sensor data from sensor units 114, user inputs, motor feedback, external communication signals (e.g., from a remote server), and/or any other signal from an operative unit 204 requiring further processing by the specialized controller 222. The receiver 302 communicates these received signals to the processor 308 via data bus 306. As one skilled in the art would appreciate, data bus 306 is the means of communication between the different components—receiver, processor, and transmitter—in the specialized controller 222. The processor 308 executes the algorithms, as discussed below, by accessing specialized computer-readable instructions from the memory 310. Further detailed description as to the processor 308 executing the specialized algorithms in receiving, processing and transmitting of these signals is discussed above with respect to FIG. 2. The memory 310 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processor 308 may communicate output signals to transmitter 312 via data bus 306 as illustrated. The transmitter 312 may be configured to further communicate the output signals to a plurality of operative units 204 illustrated by signal output 314.

One of ordinary skill in the art would appreciate that the architecture illustrated in FIG. 3 may illustrate an external server architecture configured to effectuate the control of a robotic apparatus from a remote location. That is, the server may also include at least one data bus, a receiver, a transmitter, a processor, and a memory that stores specialized computer-readable instructions thereon.

Next, FIG. 4 will be discussed. FIG. 4 is a top view diagram showing the characteristics of various risk zones around robot 202 in a non-limiting exemplary illustration in accordance with some implementations of the present disclosure. As illustrated, the shape associated with robot 202 approximates a rounded rectangular shape. Other shapes may be contemplated by one skilled in the art. The shape has an associated length, width, height, etc. In some cases, the drawn shape may approximate a footprint of robot 202, but may not precisely align with the actual size and/or shape of robot 202. Robot 202 may have a direction of motion or movement indicated by indicator 404, such as in the case of a robotic mobile platform. For example, indicator 404 may show that robot 202 may move in a plurality of directions, such as forward, backward and/or turning left or right. Any direction of motion of a robot is also contemplated, such as forward, backward, left, right, up, down, row, pitch, yaw, and/or any combination of the foregoing.

An area 402A may represent the critical risk zone of robot 202. For example, area 402A may be a zone in which anything (e.g., people, children, items, and/or other things) present in the zone would be in physical contact with robot 202. As illustrated, area 402A may be relative to the direction of movement, such as that indicated by indicator 404. In some cases, because robot 202 is moving substantially toward the direction of movement, things in the contact zone may be hit by robot 202, thereby increasing force and/or damage of an impact due to the movement of robot 202 (e.g., relative to the situations if the things ran into robot 202 without robot 202 moving). Accordingly, area 402A is mostly encompassed within a footprint of robot 202.

Similarly, area 402B may represent a higher-risk zone of robot 202. If something is in the higher-risk zone, robot 202 may not have enough time to maneuver before that thing is in area 402A, where it may collide with robot 202.

Area 402C may represent a middle risk zone, and/or a warning zone. If something is in area 402C, robot 202 may have limited maneuverability without colliding with the thing in area 402C. Accordingly, robot 202 may institute particular behaviors to address such risks such as stopping or slowing down.

Other areas are contemplated, wherein each area may be associated with a different risk. For example, there may be any number of areas 402A-402N, where N is any predetermined positive integer number/letter based on how many risk areas are assessed. For example, other areas may include one or more of a low-risk zone, no-risk zone, rear-risk zone, side-risk zone, damage zone, confined space zone, stopping zone, contact zone, and/or any zone associated with a particular level and/or type of risk.

According to at least one non-limiting exemplary embodiment, areas 402A-402N may change shape dynamically based on movements of a robot 202. For example, if a robot 202 executes a left turn, areas 402A-402N may shrink on the left side of the robot 202 and grow on the right side of the robot 202, or vice versa. As another example, areas 402A-402N may surround robot 202 when robot 202 is stationary and may change to the areas illustrated in accordance with direction of motion indicator 404 when robot 202 is moving.

According to at least one exemplary embodiment, wherein robot 202 is creating an optimization to a route, robot 202 may consider the degree of risk associated with each possible optimization and attempt to minimize the degree of risk when determining a best possible optimization to the route. According to another exemplary embodiment, the degree of risk associated with an exemplary maneuver of robot 202 may be measured by the overlap of risk zones 402A-402N with objects/obstacles in the environment, the overlap being determined on a computer-readable map of the environment. According to another exemplary embodiment, these risk zones 402A-402N may be applied to virtual robots (further illustrated in FIG. 6) to allow for the degree of risk associated with an exemplary maneuver of robot 202 to be determined without robot 202 performing the maneuver. By way of non-limiting illustrative example, if object 610 of FIG. 6 is within critical-risk zone 402A throughout a first maneuver and object 610 is within higher-risk zone 402B throughout a second maneuver, controller 222 will execute the second maneuver.

Figure 5:
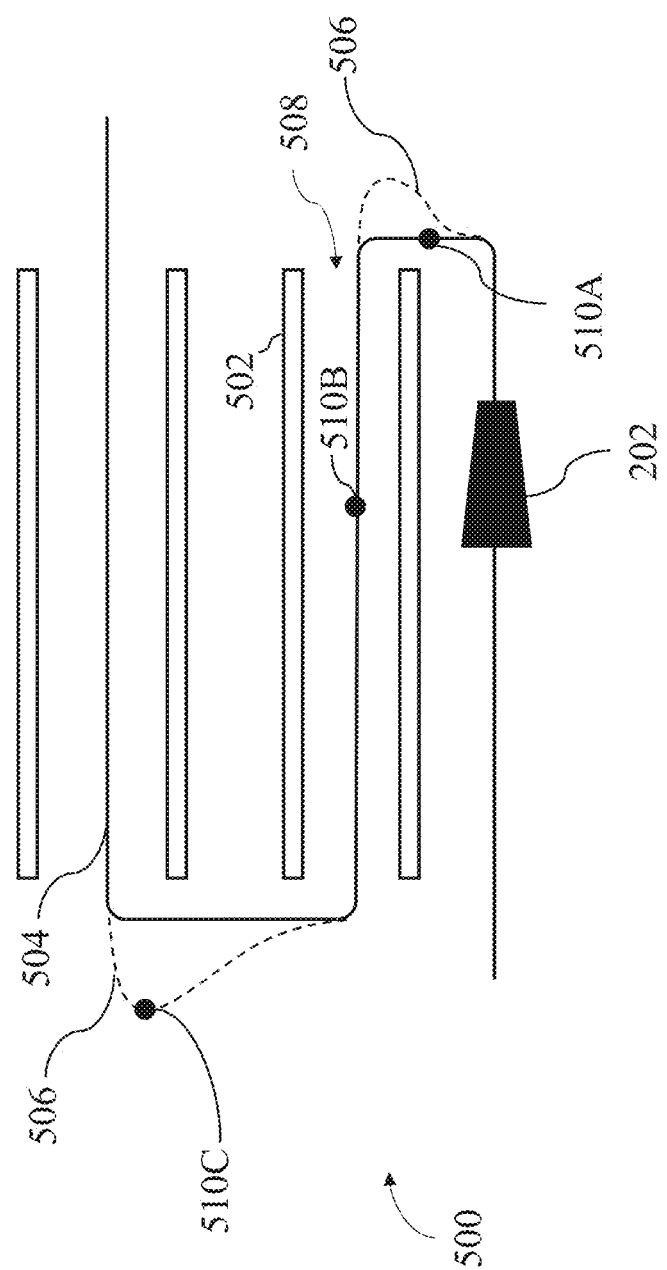
FIG. 5 is a top view illustration unoptimized and optimized routes of a robot through an environment comprising tight spaces and turns according to an exemplary embodiment.

FIG. 5 is top view of an exemplary environment 500 comprising a plurality of obstacles 502, an original route 504 to be traveled by the robot 202, and an optimization route 506 to be navigated by robot 202 according to at least one non-limiting exemplary illustration, the optimization route 506, represented by dashed lines, being different from the original route 504 and comprising a modified portion of the original route 504. According to at least one non-limiting exemplary embodiment, original route 504 may be taught or programmed to a robot 202 wherein robot 202 may operate semi-autonomously and follow an operator to learn original route 504. According to another non-limiting exemplary embodiment, original route 504 may be given to a robot 202 through wired or wireless communication by a user or network (not shown). Original route 504 may not be navigable (safely) while robot 202 is fully autonomous as it comprises sharp turns into narrow passageways 508, shown in FIG. 5. For example, a robot 202 may be taught a route by being driven manually by a user, wherein the user may not consider safety margins (e.g., predetermined minimum distances from objects) associated with autonomous operation of the robot 202 as the user drives robot 202 along tight turns into narrow passageways. In turn, requiring optimization route 506 to be made to original route 504. As illustrated in FIG. 5, route optimization 506 may comprise elastic banded segments of original route 504 to encompass a wider turn radius for robot 202 to ensure robot 202 may enter the narrow passageway 508 after a sharp turn without hitting or turning into obstacles 502.

According to another non-limiting exemplary embodiment, optimizations 506 may be required in the case of a changing environment 500 wherein objects or barriers 502 are moved, altering the path a robot needs to take to avoid collisions. Additionally, optimizations 506 may be altered to account for further changing of environment 500 around robot 202.

As shown in FIG. 5, original route 504 of robot 202 includes a plurality of state points 510. State points 510 may comprise discrete samples (e.g., taken every 1, 2, 3, etc. seconds or every 1, 2, 3, etc. meters along route 504) of state parameters of robot 202 as robot 202 executes route 504. For example, state points 510A, 510B, and 510C are illustrated, however a plurality of additional state points 510 may exist along route 504 which have been omitted for clarity. State parameters, as used herein, may include parameters of robot 202 which describe a state of robot 202 as robot 202 navigates a route 504 including, without limitation, position and orientation of robot 202, speed of robot 202, location of robot 202, specific tasks to perform at the location of a corresponding state point (i.e., actuator commands), and/or any computer-readable instructions to be executed at the state points 510. In other words, multiple state points 510 along a route 504 may comprise a pose graph of robot 202 as robot 202 executes route 504, wherein each individual state point 510 may comprise a pose, including any state parameters mentioned previously (e.g., velocity), of robot 202 at a respective location. Execution or navigation of route 504 may comprise robot 202 configuring its state parameters (e.g., velocity, orientation, configuration etc.) in accordance with state parameters of a sequence state points 510. The sequence of state points 510 (i.e., a pose graph) which comprises the route 504 may be learned by, for example, an operator manually navigating a robot 202 through route 504, wherein the sequence of state points 510 may be stored in memory as an array, matrix, or other data structure.

Controller 222 or processor 308 executes computer-readable instructions to make changes to some state points 510 along original route 504 to account for optimization route 506. These changes to original route 504 may include, but are not limited to, when (i.e., in time or distance) a particular state point 510 is reached, state parameters of a state point 510 (e.g., position, orientation, velocity, etc. of robot 202 at state points 510), where a state point 510 is stored in memory 224 (e.g., a memory address), and/or adding or removing some state points 510 along the optimized route 506. These changes to state points 510 along original route 504 ensures robot 202 is in the same state at a corresponding state point before and after the optimizations (e.g., optimization route 506) are made if the state point is not on or affected by (i.e., is not substantially close to) a segment of original route 504 that is being optimized. Stated in another way, each respective state point comprises state parameters (e.g., velocity and orientation) of the robot or autonomous device.

By way of non-limiting illustrative example, state points 510 may be stored as an array in memory 224, wherein state point 510A will be removed from the array and state point 510C will be added to the array after optimizations 506 are made. Additionally, state point 510B will comprise the same state and location within environment 500 but may be moved within the array to account for added or removed state points due to route optimization 506. In another non-limiting illustrative example, state parameters, such as velocity and orientation of robot 202, of select or some state points 510A and 510C may be changed such that robot 202 executes route 504 with optimizations 506, while not changing state parameters of other state parameters, such as state point 510B; resulting in selective optimization of certain state points only.

FIG. 6 is a top view of robot 202 navigating into narrow passageway 614 following a known or predetermined route 602, according to a non-limiting exemplary embodiment. Controller 222 and/or processor 308 executes computer-readable instructions to generate a plurality of virtual robots 606, further comprising virtual robots 606A, 606B, and a plurality of other virtual robots (not shown). These virtual robots 606A, 606B may generate footprint indices, which may be used by controller 222 or processor 308, by executing computer-readable instructions, to detect future collisions by calculating collision points 608, comprising points where the virtual robots 606A, 606B footprint indices overlap with a respective object 610 on a computer-readable map. It is appreciated that virtual robots 606 are not physical entities, rather projections of robot 202 on the computer-readable map of an environment of robot 202.

Controller 222 or processor 308 may execute computer-readable instructions to determine route 602 navigates into a narrow passageway 614 between two objects 610 using methods illustrated below in FIGS. 9A-C and FIG. 10. Accordingly, controller 222 or processor 308 executes computer-readable instructions to generate a plurality of virtual robots 606 prior to robot 202 navigating along route 602 (i.e., a pre-planned or original route) to test a plurality of possible optimizations to a known route 602 for collision points 608 with respect to the respective barriers 610, wherein one of the plurality of possible optimizations is illustrated as optimized route 604. Optimized route 604 may be tested by controller 222 or processor 308 executing computer-readable instructions to project virtual robots 606B along the optimized route 604. For example, virtual robots 606 may test 100 respective potential optimizations to portion 616 of route 602. Controller 222 or processor 308 executes computer-readable instructions to determine the best optimization to segment 616 comprises optimized route 604 based on a plurality of parameters including, but not limited to, the elimination of collision points 608 with the respective barriers or obstacles 610, additional length added by optimization route 604, distance between robot 202 and object 610 as robot 202 executes the turn, the degree of risk associated with an optimized route 604 (i.e., proximity to objects 610 in accordance with areas 402 illustrated in FIG. 4), data from operative units 204, other nearby objects, and/or physical properties of robot 402 (e.g., width, length, shape, turn radius, etc.).

As illustrated, virtual robot 606A may test (i.e., be projected along) an original portion 616 of route 602 and detect collision points 608 during execution of a left turn into narrow passageway 614 (i.e., a space between the two objects 610), thereby indicating to controller 222 or processor 308 that a collision may occur if robot 202 executes route 602 with portion 616. Virtual robot 606B may test an optimization route 604 to portion 616 of route 602, the optimization route 604 comprising no collision points 608 as tested using a virtual robot 606B. A plurality of additional virtual robots 606 may also test similar optimizations to portion 616 which have been omitted for clarity, wherein it may be determined that optimization route 604 tested by virtual robot 606B is a best optimization to portion 616 of route 602 based on the aforementioned parameters.

According to at least one exemplary embodiment, robot 202 may calculate optimization route 604 in advance (e.g., with robot 202 being in a distant location), or prior to travelling nearby the objects 610, by controller 222 or processor 308 executing computer-readable instructions to impose virtual robots 606 on a computer-readable map of the environment 600 and utilizing mapping and localization units 226 and map evaluation units 228 to further evaluate possible routes to find optimizations 604. In other words, controller 222 or processor 308 executes computer-readable instructions to allow the robot 202 to, in essence, foresee its actions and position in a future point in time prior to undertaking that action.

Still referring to FIG. 6 one or a plurality of collision points 608 may be detected along segment 616 of known route 602, causing controller 222 or processor 308 to execute computer-readable instructions stored in memory 224 to find a best or optimal optimization route 604 to segment 616, which is a portion or segment of the original route 602. The best or optimal optimization route 604 may be found by controller 222 or processor 308 imposing virtual robots 606 to test the optimization route 604. Alternatively, in one or more non-limiting exemplary embodiments, collision points 608 may not be present during testing using virtual robot 606A navigating portion 616, thereby allowing robot 202 to navigate its original path 602, including portion 616, without the need for optimization route 604.

According to at least one non-limiting exemplary embodiment, collision points 608 may be illustrative of a critical risk zone 402A, or other risk zone 402, overlapping with object 610 on a computer-readable map, wherein overlapping of the risk zone 402A with the object 610 on the computer-readable map may be unacceptable (e.g., for safety reasons), thereby requiring an optimization 604 to portion 616 of route 602 to be determined.

According to at least one non-limiting exemplary embodiment, detection of collision point 608 may cause controller 222 or processor 308 to execute computer-readable instructions to cause robot 202 to halt, or come to a complete stop, and execute specialized algorithms to find optimization route 604 utilizing virtual robots 606 and methods aforementioned in the present disclosure. As noted above, these virtual robots are projections on a computer-readable map of the robot 202 in the future or at a later time that the robot 202 forms prior to undertaking the route 602 or optimizing route 604.

According to at least one non-limiting exemplary embodiment, a sensor unit 214 may be utilized to detect objects 610 nearby the route 602 within a predetermined threshold distance on either side of route 602. Upon detecting the objects 602 are nearby route 602, within the threshold distance, controller 222 or processor 308 may execute computer-readable instructions to determine and navigate optimization route 604, corresponding to a best optimization to a segment 616 of route 604. In some instances, robot 102 may detect the objects 610 being nearby route 604, within the threshold distance, upon navigating nearby the objects 610, wherein robot 202 may backtrack along route 602 to determine an optimization 604 to be applied to portion 616 of route 602 and subsequently execute the optimization route 604 to avoid collision.

Figure 8B:
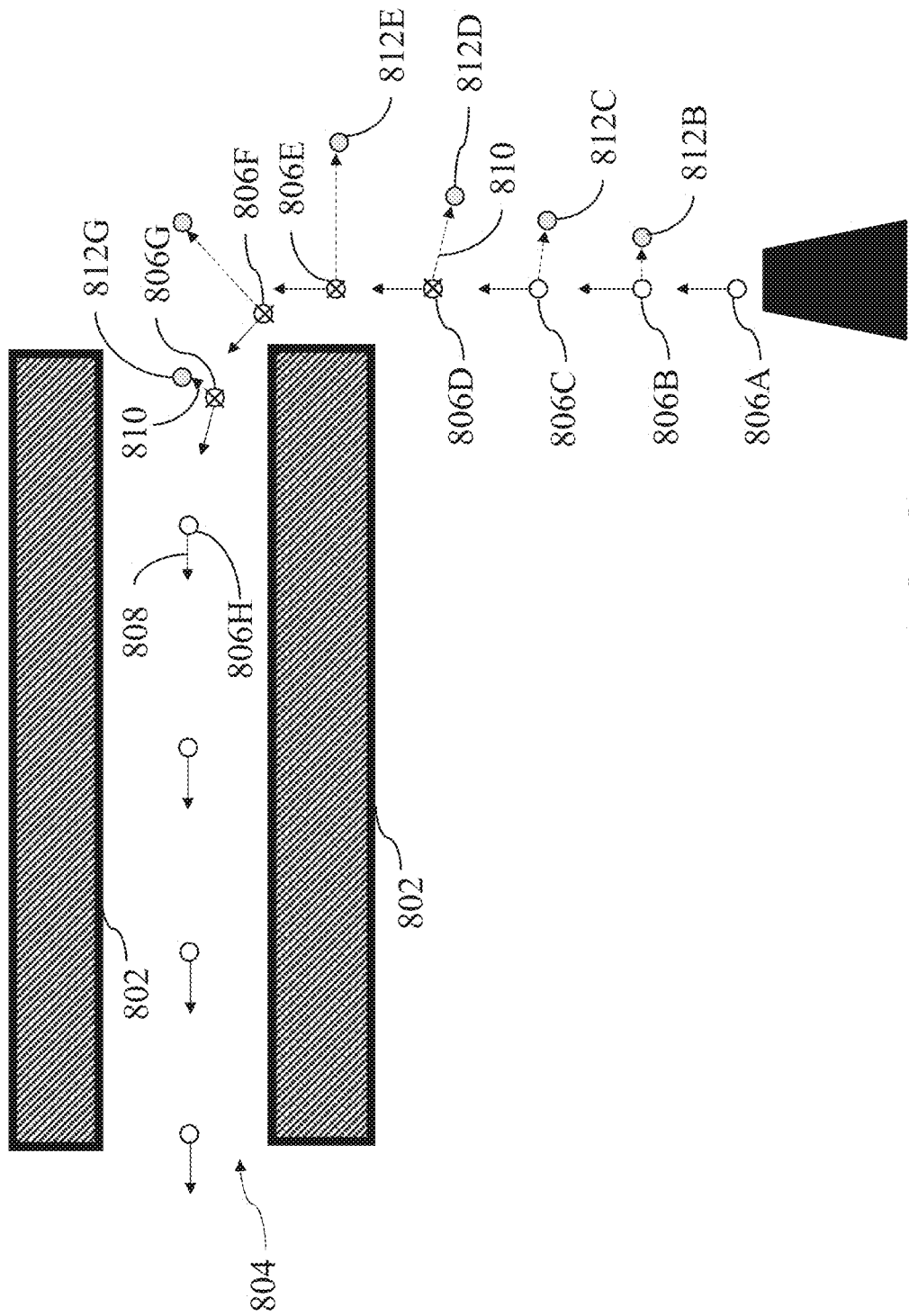
Figure 8C:
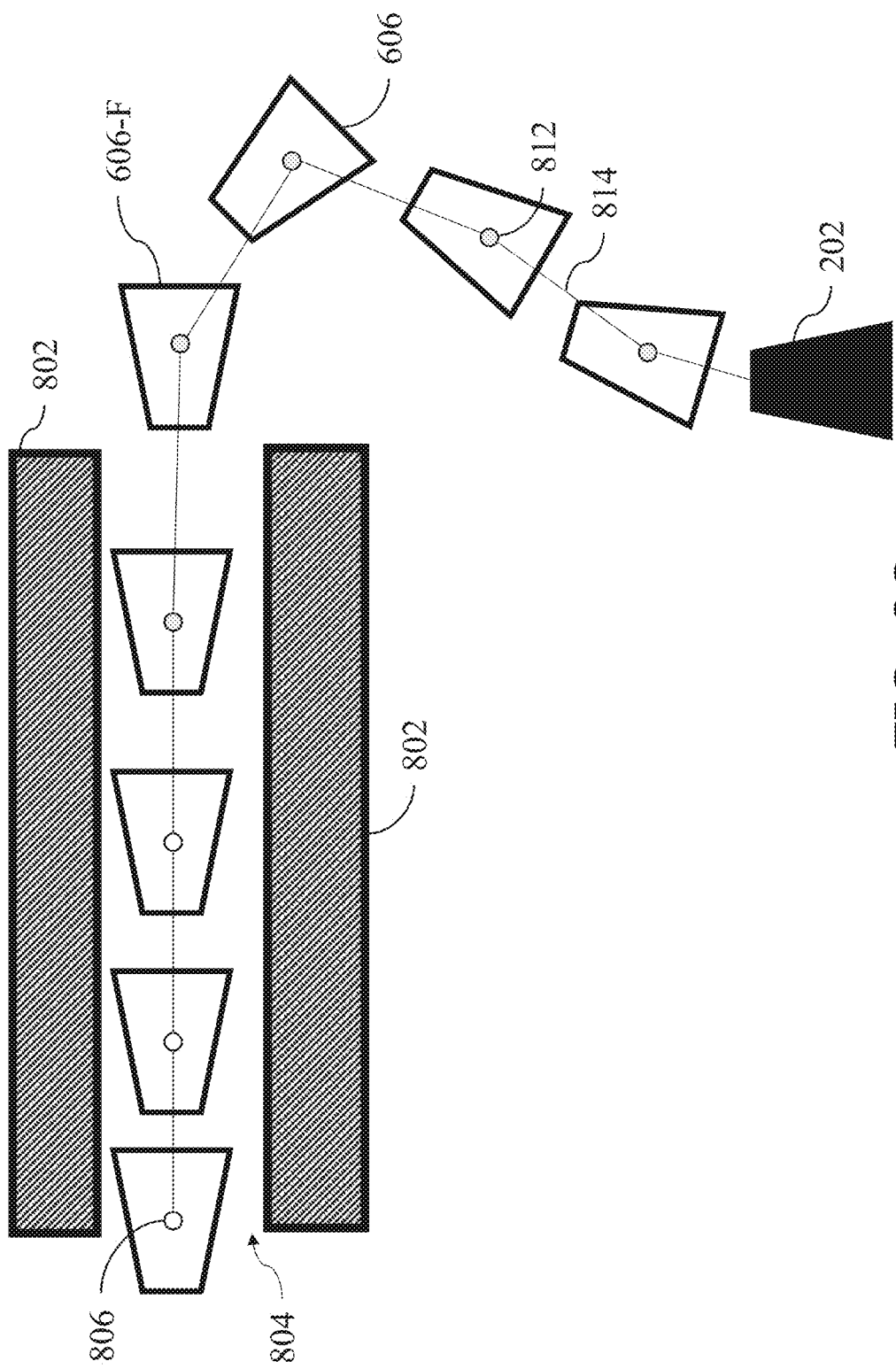

As illustrated, controller 222 or processor 308 may execute computer-readable instructions to apply optimization route 604 by elastic banding segment 616 of route 602, wherein elastic banding the segment 616 comprises increasing the distance from objects 610 of robot 202 as it navigates a turnaround object 610, as further illustrated in FIGS. 8A-C. In other words, elastic banding segment 616 is analogous to stretching or expanding the segment 616 away from objects 610 to encompass a wider turn radius for robot 202 to navigate into narrow passageway 614, thereby, reducing the risk of collision and/or changing the orientation of robot 202 as it enters or approaches the narrow passageway 614 to minimize risk and eliminate collision points 608 with respective barriers 610. For example, virtual robot 606B, representative of a position and orientation of robot 202 during navigation of optimized route 604, is orientated in a substantially forward direction prior to or just as the virtual robot 606B enters the narrow passageway 614.

According to another non-limiting exemplary embodiment, controller 222 or processor 308 may execute computer-readable instructions to store/recall the location of state points 612 along known route 602 from memory 224. According to at least one non-limiting exemplary embodiment, a known route 602 may comprise a plurality of state points 612 (e.g., 612A, 612B, 612C and 612D as illustrated) wherein their locations along known route 602 are stored in memory 224. Next, the controller 222 or processor 308 may execute computer-readable instructions to make changes to data stored in memory 224 corresponding to the plurality of state points 612 to account for optimization route 604 made to segment 616 of known route 602.

As shown in FIG. 6, optimization route 604 comprises manipulation of a select few state points along route 602, more specifically state points along portion 616 of route 602. FIG. 8B below further illustrates which state points 612 are selected to be manipulated and how they are manipulated in greater detail. As a non-limiting example, optimization route 604 of route 602 is being done near state points 612B and 612D as these state points, among others (not illustrated), lie along or are substantially close to (e.g., within state points) portion 616 of route 602, wherein portion 616 may be determined to cause collision points 608 if navigated by robot 202. Whereas state point 612A is not changed as shown in FIG. 6 as it is not near optimization route 604. In other words, by way of non-limiting illustrative embodiment, state point 612A is not located on or near a segment 616 of route 602 that is changed to optimization route 604. Stated another way, some state points may be optimized while other state points may not be changed.

Absent an optimization route 604, it may cause controller 222 or processor 308 to execute computer-readable instructions to ensure the state parameters of robot 202 at state point 612A are maintained before and after applying optimization route 604 to portion 616 of route 602 by making some or no changes to data corresponding to state point 612A stored in memory 224 using methods substantially similar to those previously illustrated in FIG. 5. Stated another way, since the location of the state point 612A is not changed after optimization route 604 is applied, state parameters corresponding to state point 612A are not updated, changed or modified. It is appreciated that some (e.g., one, two, three, etc.) state parameters of state points further along route 602 and subsequent to state point 612D may be manipulated to account for a change in orientation and/or speed of robot 202 as robot 202 navigates optimization route 604 into narrow passageway 614 instead of original portion 616 of route 602.

Similarly, according to at least one non-limiting exemplary embodiment, controller 222 or processor 308 may execute computer-readable instructions to remove state points 612B along the known path 602 of the robot 202 to account for optimization route 604, the state point 612B being located on a segment 616 of known route 602, wherein segment 616 is changed to optimization 604 due to detection of potential collision using virtual robot 606A. In optimizing the known route segment 616 in order to avoid collision points 608 with the barriers 610, state point 612B along the original route 602 may be assigned to a new location that corresponds to state point 612C. Controller 222 or processor 308 may execute computer-readable instructions to update data stored in memory 224 corresponding to the location and state of state point 612B. Additionally, state point 612C may be added in memory 224 by controller 222 or processor 308 executing computer-readable instructions to the set of state points 612 along the known route 602 with optimization route 604.

According to at least one non-limiting exemplary embodiment, state point 612D may be located both on optimization route 604 and known route 602 wherein the location of state point 612D may be left unchanged after optimization route 604 is applied to portion 616 of route 602. However, according to at least one non-limiting exemplary embodiment, controller 222 or processor 308 may execute computer-readable instructions to modify the state parameters (e.g., orientation and velocity of robot 202) corresponding to state point 612D in memory 224 to account for optimization route 604. Such state parameters may be modified prior to or ahead of robot 202 traveling to the actual location along route.

The presence of state points 612 presented in FIG. 6 are intended to be illustrative and non-limiting. In some embodiments, a robot 202 may execute a route (e.g., 602) using other contemporary motion planning methods which do not include state points 612. For example, robot 202 may utilize pre-calculated motion primitives and/or cost evaluation to effectuate navigation along a route 602. In these embodiments, for example, costs may be manipulated to configure robot 202 to follow a similar optimization route 604 into narrow passageway 614 by elastic banding (i.e., extending away from object 610) portion 616 of route 602. That is, state points 612 are illustrative of one method of planning and manipulating a route 602, and parameters thereof, wherein the systems and methods of this disclosure for elastic banding a route around objects and/or into narrow passageways may be applied to any motion planning method as appreciated by one skilled in the art.

According to some exemplary embodiments some, none, all, or additional state points may be present along a route 602 before and/or after optimization route 604 is applied. Additionally, the order in which state points 612A-D appear along known route 602 as illustrated in FIG. 6 is not intended to be limiting. These state points as discussed above are points along the original route traveled by robot 202 that in turn act as guideposts or reference points for the robot 202 as it optimizes a segment of the original route. These state points 612 assist the robot 202 in making optimizations to segment of the original route 602 traveled by the robot 202 by manipulating state parameters associated with the state points 612 in memory, as illustrated in FIG. 7 below.

According to at least one exemplary embodiment, controller 222 or processor 308 may execute computer-readable instructions to additionally utilize specialized risk analysis algorithms when determining optimization route 604. According to at least one exemplary embodiment, this specialized risk analysis algorithm may comprise controller 222 or processor 308 executing computer-readable instructions to minimize the risk associated with navigating a route, as illustrated above in FIG. 4, by ensuring ample distance between robot 202 and nearby objects. According to at least one non-limiting exemplary embodiment, optimization route 604 may comprise the optimization, out of the plurality of possible optimizations tested, with the lowest degree of predetermined risk corresponding to minimal overlap between critical risk zone 402A, high risk zone 402B, or other risk zone 402 with objects 610 on a computer-readable map. Stated differently, controller 222 or processor 308 may execute computer-readable instructions to identify a plurality of optimization routes that robot 202 can undertake. However, it is capable of selecting the optimal or most ideal route that has the least risk of encountering a collision with a barrier, the risk being proportional to a distance of robot 202 from the object 610.

Additionally, after applying optimization route 604 to segment 616 of known route 602, controller 222 or processor 308 may execute computer-readable instructions to utilize a plurality of operative units 204, as illustrated in FIG. 2, to navigate robot 202 once the optimization route 604 is found.

Advantageously, the found optimization route 604 may allow robot 202 to navigate into narrow passageway 614 without collision by orienting robot 202 in a substantially forward direction prior to entering the narrow passageway 614, which may minimize the risk of collision with environment barriers 610. It is appreciated that orienting the robot 202 forwards prior to entering the narrow passageway 614 is advantageous to robots 202 comprising a width less than its length, however executing wider turns (e.g., elastic banding a route) to avoid collisions with objects 610 may be applied to any robot 202 of any size or shape. Additionally, risk analysis operations may allow for controller 222 to determine a best optimization using additional parameters, which may be useful in determining the best optimization from a plurality of possible optimizations.

Next, FIG. 7 will be described. FIG. 7 is an exemplary embodiment of data stored in memory 224 comprising a set of incremental positions along a route at arbitrary or predetermined distances (e.g. 0.1, 1, 2, 3, etc. meters, inches, centimeters, etc.) and positional coordinates which robot 202 will be located at each route position. Positions along route may similarly, in some embodiments, correspond to state points. As shown in FIG. 7, for each position along the route (e.g., 1, 2 . . . N) includes a corresponding set of coordinates $(X_1, Y_1 \ldots X_N, Y_N)$. Upon performing optimization to only a segment of an original route, or the entire route, controller 222 or processor 308 may execute computer-readable instructions to update these coordinates and store them under a different set of columns labeled as "New Path." In other words, the table format for storing data in memory may be a self-referential table that updates on its own through execution of specialized algorithms and relates the coordinates of the original path with the coordinates of the new path such that, upon subsequent execution, position 1 will relate to original path $(X_1, Y_1)$ and new path $(X_1+\Delta X_1, Y_1+\Delta Y_1)$.

According to at least one non-limiting embodiment, while controller 222 or processor 308 may execute computer readable instructions to optimize a route, it may make changes, represented by a delta (Δ), to the positional coordinates along the path of robot 202 corresponding to a location along the route. These positional changes may be calculated by controller 222 or processor 308 executing instructions. According to another non-limiting exemplary embodiment, none, one, or a plurality of positions may be changed, removed, and/or added to optimize the route robot 202 will take. According to another non-limiting exemplary embodiment, the data types illustrated in FIG. 7 (e.g., X and Y positional coordinates) may comprise the same, similar, or different data types, indicative of the position along a route of robot 202, from the types illustrated in FIG. 7.

According to at least one non-limiting exemplary embodiment, position 1 may not be the initialization location of robot 202. Similarly, the positions along the route illustrated in FIG. 7 are not indicative of any particular position on the route and are illustrative of sequential positions along a route, separated by an arbitrary or predetermined, constant or otherwise, interval. According to another non-limiting exemplary embodiment, the positions along route may correspond to a set of state points 612, as illustrated above in FIG. 6, along a route wherein the positional location and state parameters of the state points 612 may be adjusted to account for optimization route 604. According to another non-limiting exemplary embodiment where the positions along route correspond to plurality of state point, state parameters (e.g., position, orientation, speed, etc.) corresponding to the respective locations along the route or path may also be adjusted and stored in memory 224 to account for optimizations made to the original route.

According to at least one non-limiting exemplary embodiment, the change in positional coordinates, illustrated by a delta, may vary or remain constant across a plurality of positions and may be greater than, less than, or equal to zero. According to another exemplary embodiment, the change in positional coordinates may be based on a plurality of parameters of robot 202, including, but not limited to, the size, shape, speed, turn radius, and/or any other physical parameter of robot 202.

Next, FIG. 8A will be described. FIG. 8A is a top view illustration of a robot 202 detecting a tight turn into a narrow passageway 804 between two objects 802 and utilizing elastic banding of a route, or portion thereof, to avoid collision with the objects 808, according to an exemplary embodiment. The route may comprise a plurality of state points 806, each state point 806 comprising a spatial location (e.g., on a computer readable map) and state parameters of robot 202 to follow at the respective spatial location, state parameters, including at least velocity and orientation of robot 202, and may further include actuator commands and/or computer readable instructions to execute at respective state points 806. Robot 202 aligning itself with sequential state parameters of sequential state points may configure robot 202 to navigate the route (e.g., by following a pose graph formed by the state points 806).

To detect if the route is navigable without collision, controller 222 or processor 308 may execute computer readable instructions to project a plurality of virtual robots 606 ahead of itself along the route, wherein each virtual robot 606 is projected onto a respective state point 806 of the route. Upon projection of the virtual robots 606, many of which are omitted for clarity as the route may comprise hundreds of state points or more, one or more collision points 608 may be detected. Collision points 608 may comprise a region of overlap between a virtual robot 606 footprint and object 802 on the computer readable map or may comprise one or more risk zones (e.g., 402A) illustrated in FIG. 4 above overlapping with object 802. Accordingly, optimizations to the route are required to avoid collision of robot 202 with objects 802, as illustrated next in FIG. 8B.

FIG. 8B illustrates state points 806 of a route to be navigated by a robot 202 previously illustrated in FIG. 8A, according to an exemplary embodiment. It is appreciated that additional state points 806A-H have been illustrated from the embodiment illustrated in FIG. 8A above; however, the route may comprise more or fewer state points 806. Each state point 806 may comprise state parameters, wherein state parameters may include, at least, a velocity illustrated by vectors 808 (illustrated with solid lines) for robot 202 at each respective state point 806. The velocity vectors 808 indicate speed and orientation of robot 202 at locations associated with the respective state points 806 to cause robot 202 to navigate the route.

Controller 222 or processor 308 may execute computer readable instructions to determine a tight turn along the route based on a rate of change of vectors 808 exceeding a threshold over a predetermined distance. The rate of change comprising a rate of angular change. For example, if velocity vector 808 changes from pointing upwards (i.e., such as at state point 806E) to pointing laterally (i.e., at state point 806H) within a predetermined distance (e.g., within N state points, N being any integer), then the turn may be considered tight. Tight turns may require robot 202 to elastic band segments of the route comprising the tight turns to avoid collision with objects 802 and navigate smoothly. The controller 222 or processor 308 may further execute computer readable instructions to determine the narrow passageway 804 based on a proximity of objects 802 to respective state points 806 in between objects 802 being below a threshold distance on a computer readable map. The threshold distance may equal a width of robot 202 plus a predetermined value corresponding to a desired clearance between robot 202 and objects 802 (e.g., 5 inches of clearance on either side of robot 202 to ensure safe operation of robot 202).

To elastic band the route, some state points 806D-G may be determined to cause collisions 608 and/or comprise tight turns by controller 222 or processor 308 executing computer readable instructions to project virtual robots 606 onto the respective state points 806D-G. These state points 806D-G are illustrated with a cross. An elastic band vector 810 (dashed arrows) may be determined, by controller 222 or processor 308 executing computer readable instructions, for each of the state points 806D-G (as well as state points in between 806D-G not illustrated), wherein the elastic band vector 810 is substantially orthogonal to the velocity vector 808 and/or extends away from a nearest object 802. Elastic band vectors 810 illustrate a change in location of a respective state point 806 during the elastic banding of the route. Magnitudes of the elastic band vectors 810 may be proportional to a proximity of a respective state point 806 to a nearby object 802, wherein state points 806E-F may comprise large elastic band vectors 810 as they are substantially closer to object 802. Whereas state point 806D may comprise a smaller elastic band vector 810 as state point 806D is further from objects 802. State point 806G may comprise a small elastic band vector 810 due to its proximity to both objects 802 (i.e., potential optimizations to state point 806G are constrained). Stated differently, each state respective state point along the route may have an elastic band vector with a different magnitude as the difference in magnitude is dependent on the location of the respective state point from object 802.

It is appreciated that the magnitudes (i.e., lengths) of the elastic band vectors 810 are calculated in a way that effectuates extension of the route away from object 802 while adding a minimal amount of additional length to the route. Magnitudes of elastic band vectors 810 may be representative of a magnitude of a $\Delta X_n$ and/or $\Delta Y_n$ values added to (x, y) positions of positions along route of the table illustrated in FIG. 7 for an $n^{th}$ state point 806.

New state points 812D-G (illustrated in grey) may replace or alter state points 806D-G to configure the route to extend away from objects 802 and comprise a wider turn into the narrow passageway 804 between the two objects 802 (i.e., elastic banding). The new state points 812 being located at ends of elastic banding vectors 810 of respective state points 806. Additional optimizations to state points 806B-C nearby the optimized state points 806D-G may also be performed using elastic banding vectors 810 such that robot 202 executes smooth movements around object 802 and into narrow passageway 804. For example, a rate of angular change of a velocity vector 808 between a state point 806C and a subsequent, optimized state point 812D may exceed a threshold value, thereby requiring some extension of state point 806C as illustrated by optimized state point 812C. That is, that optimizations (i.e., changes) to some state points (e.g., 806B-C) spaced sufficiently far from objects 802 are a result of optimizing other nearby/neighboring state points (e.g., 806D-G) which require optimization to avoid collision, as appreciated by one skilled in the art, wherein optimizations to state points 806B-C may effectuate smooth movements of the robot 202. Smooth movements of robot 202 may be desirable to humans nearby the robot 202 as smooth movements are predictable and aesthetically pleasing to the nearby humans. In other words, optimization of certain state points may be affected, or be taken into account, optimization of other state points. As noted above, optimization of state point 806B-C may in turn affect the optimization of nearby or concurrent state points 806D-G.

Velocity vectors 808 for the optimized state points 812B-G may be determined using, for example, a pose graph, such that the robot 202 navigates over the respective state points 812B-G in accordance with the modified route. It is appreciated that, by navigating over the newly determined state points 812B-G, robot 202 may follow a path substantially similar to optimization 506 illustrated in FIG. 5 and optimization 604 illustrated in FIG. 6 above.

It is appreciated that a plurality of potential optimized state points 812B-G for respective state points 806B-G may be determined and tested, wherein only optimized state points 812B-G corresponding to a best (i.e., optimal) route are illustrated. For example, controller 222 or processor 308 may execute computer readable instructions to test N potential elastic band vectors 810 for each respective state points 806, N being any integer number, wherein the elastic banding vectors 810 of optimized state points 812 illustrate may comprise a selected one of the N potential optimizations to state points 806 corresponding to a best optimization to the route. Each of the N potential elastic band vectors 810 tested may comprise different magnitudes and/or different directions away from their respective state points 806. The optimization being based on, without limitation, additional route length added, distance to objects 802 (e.g., in accordance with areas 402 illustrated in FIG. 4 above), and/or a rate of angular change of robot 202 during navigation of the optimization.

Lastly, FIG. 8C illustrates a plurality of virtual robots 606 imposed onto a computer readable map by a controller 222 or processor 308 executing computer readable instructions to test optimizations to the route illustrated in FIG. 8B above, according to an exemplary embodiment. Virtual robots 606 may illustrate a path 814 of robot 202 when robot 202 executes the optimized route, the optimized route comprising one or more optimized state points 812 (illustrated in grey) determined using methods illustrated in FIGS. 8A-B above. The path 814 comprising a wider turn into the narrow passageway 804. It is appreciated that a plurality of additional state points 806, 812 may exist along path 814, wherein only a few discrete samples are illustrated for clarity (i.e., the route 814 navigated by robot 202 may be substantially smoother than illustrated). It is further appreciated that a virtual robot 606-F is orientated substantially forwards prior to entering the narrow passageway 804, thereby further reducing a chance of collision when robot 202 executes optimized path 814.

Advantageously, use of determining sharp turns based on an angular rate of change of a velocity vector 808 may enable a robot 202 to predict potential hazardous maneuvers (e.g., tight turns into narrow passageways) as well as smooth out an optimized portion of a route prior to the robot 202 navigating the route. Smoother routes may appear more desirable and more predictable to humans observing navigation of robot 202 than routes with sharp turns. Further, elastic banding state points 806 away from objects 802, as illustrated by elastic band vectors 810 and optimized state points 812, may enable robot 202 to navigate into a narrow passageway without collision by executing wider turns around objects 802. Additionally, optimizations to the route (i.e., modifications to state points 806B-G) may enable a robot 202 to orient itself in a forward direction prior to entering the narrow passageway between objects 802, thereby further reducing a chance of collision with the objects 802 for robots 202 comprising a width less than a length.

Next FIG. 9A-C will be discussed in detail. FIG. 9A-C are a top view of a method for detecting a narrow passageway along a route 902 by extending the width of a footprint of robot 202 as robot 202 navigates path 902 to detect prospective collision points 906A-B, according to an exemplary embodiment. The collision points 906A-B comprise locations where the extended footprint 904 overlaps with an obstacle.

FIG. 9A illustrates an exemplary illustrative embodiment of a top view of robot 202 navigating a navigation path 902 using an extended footprint 904A on "side A" to detect the presence and location of collision points 906A on the "A side," or left side as illustrated, of robot 202. As used herein with respect to FIG. 9A-C, collision points 906A and 906B are indicative of a collision with an extended footprint 904 of the robot 202 and a nearby object, similar to collision points 608, illustrated above in FIG. 6, with virtual robots 606 and objects 610. Stated differently, collision points 606 and 906 represent overlap between a virtual robot 606 or virtual extended footprint 904 of robot 202, respectively, with an object on a computer readable map. Five collision points 906A are illustrated in FIG. 9A; however, one skilled in the art would appreciate that plurality of collision points 906A may be present along the path 902. As illustrated in FIG. 9A, controller 222 or processor 308 may execute computer readable instructions to store the locations of collision points 906A in memory 224 as it navigates along route 902 by having the controller 222 or processor 308 execute computer readable instructions to receive such inputs from various sensor units 214 and store the locations in memory 224 on a computer readable map of the environment. Collision points 906A may be indicative of collisions with robot 202's extended footprint 904A and surrounding obstacles.

According to at least one non-limiting exemplary embodiment, collision points 906 may be determined based on detecting an object using sensor units 214 within a threshold distance from robot 202. The threshold distance corresponding to a distance that extended footprint 904 extends from robot 202, similar to detecting an object within one or more risk areas 402 illustrated in FIG. 4 above. That is, use of an extended footprint is intended to be illustrative and non-limiting.

Similarly, FIG. 9B illustrates an exemplary illustrative embodiment of a top view of robot 202 navigating path 902 with an extended footprint 902B on "side B," or right side as illustrated, of robot 202. "Side B" being opposite to "side A," wherein the presence and location of collision points 906B on "side B" of robot 202 are detected along the route 902. Four collision points 906B are illustrated in FIG. 9B; however, one skilled in the art would appreciate that additional or fewer collision points 906B may be present along the path 902. As illustrated in FIG. 9B, controller 222 or processor 308 may execute computer readable instructions to store detected collision points 906B, found on side B, in memory 224 on a computer readable map of the environment. According to some exemplary embodiments, a footprint may be extended on both side A and B of robot 202 simultaneously and collision points 906A and 906B may be detected on both sides simultaneously as robot 202 navigates route 902. According to at least one exemplary embodiment, controller 222 may store the locations of collision points 906A and 906B, of both "side A" and "side B" respectively, simultaneously in memory 224 on a computer readable map of the surrounding environment.

FIG. 9C illustrates an exemplary illustrative embodiment of a top view of a computer readable map recalling the positions of all collision points 906A and 906B along route 902 found as robot 202 navigates the route 902 with extended footprints, as previously illustrated in FIGS. 9A and 9B. Collision points 906A and 906B may be categorized either as a single collision point 908 or a pair of collision points 910, wherein a single collision point 908 is indicative of an obstacle or object nearby robot 202 on a respective side A or B and a pair of collision points 910 may be indicative of obstacles or objects on both sides A or B. Locations along route 902 where pairs of collision points 910 may correspond locations along the route, which pass through a narrow passageway. At some locations along the route 902, single collision points 906A or 906B may be detected corresponding to an object being on a single respective side A or B of the robot 202. At some locations along route 902, pairs 910 of collision points 906A and 906B may be detected on both sides A and B of robot 202. Locations along route 902 where pairs 910 of collision points 906A and 906B are detected may correspond to the locations being within a narrow passageway.

According to at least one non-limiting exemplary embodiment, for two collision points to be indicative of a pair 910 of collision points 906A and 906B, they may be required to be positioned within the same cross-sectional plane 912. The cross-sectional plane 912 may be orientated orthogonal to the route 902 as illustrated or may be orientated along any angle with respect to route 902. Additionally, the pair 910 of collision points 906A and 906B may be required to comprise both collision points 906A and 906B on both "side A" and "side B" of robot 202, respectively, to lie within cross-sectional plane 908.

According to at least one non-limiting exemplary embodiment, robot 202 may use a virtual robot, substituting robot 202 as illustrated in FIG. 9A-C with a virtual robot. The virtual robot comprising an extended virtual footprint, extended on both sides A and B, to determine a narrow passageway using substantially similar methods to those aforementioned in FIG. 9A-C. According to the same exemplary embodiment, robot 202 may impose the extended virtual robot footprints on a computer readable map of the environment, which may allow robot 202 to identify a narrow passageway along a route while being in a location far away from the narrow passageway.

Advantageously, the systems and methods illustrated in FIG. 9A-C may allow a robot 202 to determine a narrow passageway along a route autonomously (e.g., without a user telling the robot where the narrow passageway is) or during training. A robot determining a narrow passageway autonomously or during training may reduce the operational costs to a user operating the robot.

FIG. 9D is an exemplary embodiment of data stored in memory 224 comprising a set of incremental positions along a route at arbitrary or predetermined distances (e.g., 0.1, 1, 2, 3, etc. meters, inches, centimeters, etc.), binary values representative of an object being or not being detected by an extended footprint on "side A" or "side B" at a corresponding position along the route, and a determination column based on the detection of an object on "side A" or "side B". As shown in FIG. 9D, controller 222 or processor 308 may execute computer readable instructions to determine an object to be present on "side A" or "side B" of the robot 202 as it navigates a route using an extended footprint, as illustrated in FIG. 9A-B. Upon detection of an object, for example on "side A" at position 1 as illustrated, controller 222 or processor 308 may execute computer readable instructions to set the binary value to 1, wherein a value of 1 corresponds to a positive object detection reading. Upon determining the binary values corresponding to object detection on "sides A" and "side B," controller 222 or processor 308 may execute computer readable instructions to determine a narrow passageway or an object based on the binary values.

The exemplary data table illustrated in FIG. 9D further comprises a determination column wherein the binary object detection values of "side A" and "side B" are compared to determine narrow passageways and/or objects along the route. According the exemplary embodiment illustrated in FIG. 9D, controller 222 or processor 308 may execute computer readable instructions to determine a narrow passageway to be present at one or more positions along the route based on locations where the object detection values for both "side A" and "side B" are 1 (i.e., a logical AND operation). Additionally, controller 222 or processor 308 may execute computer readable instructions to determine an object to be present on either "side A" or "side B" based on one value being 1 corresponding to the side wherein the object is located. As illustrated, at positions along the route where both "side A" and "side B" have an object detection value of 0 at a position wherein controller 222 or processor 308 may execute computer readable instructions to store the determination value in memory 224 as a 0 value corresponding to neither an object nor narrow passageway being detected at the position.

According to another non-limiting exemplary embodiment, a narrow passageway may be determined based on a plurality of subsequent positions along a route having an object detection value of 1 for both "side A" and "side B". For example, a controller of a robot at position 3 in table 9D may not determine position 3 to be within a narrow passageway until it reaches position 4 wherein, upon detecting subsequent positions having object detection values of 1 for both "side A" and "side B," the controller may determine position 3 and 4 to be within a narrow passageway.

According to at least one non-limiting exemplary embodiment, table 9D may comprise more or fewer columns comprising the same or different data types. For example, a controller may store an object detection reading as it navigates a route in two arrays, one for "side A" and the other for "side B", wherein comparing the arrays using substantially similar methods as illustrated above may allow the controller to determine a narrow passageway along the route. In other words, the table format for storing data in memory may be a self-referential table that updates on its own through execution of specialized algorithms, wherein the value of N may be any positive integer number.

FIG. 10 illustrates another method for detecting a narrow passageway, according to a non-limiting exemplary embodiment. A computer readable map of an environment illustrated may be provided to robot 202 and/or generated during prior navigation along route 1002 (e.g., during training of the route 1002) by a controller 222 or processor 308 executing computer readable instructions. The computer readable map may at least comprise of localized objects 1004 thereon, as well as route data (e.g., state points) for route 1002. A narrow passageway between the two objects 1004 may be determined based on the two objects 1004 being present on both opposing sides of route 1002 within a threshold distance. The threshold distance being proportional to a width of robot 202. The threshold distance being measured perpendicular to a direction of travel along route 1002 (i.e., along directions 1006). If two objects 1004 are detected on the computer readable map within the threshold distance on either side of route 1002 at any point along the route 1002, a narrow passageway may be determined between the two respective objects 1004. Accordingly, controller 222 or processor 308 may execute computer readable instructions to perform an optimization 1008 to the route 1002 in accordance with the systems and methods of this disclosure (i.e., the optimization 1008 comprises elastic banding a portion of route 1002).

As illustrated, upon detecting objects 1004 are below a threshold distance away from route 1002, an optimized portion 1008 be determined, using methods discussed above, and replace a portion of route 1002. The optimization 1008 configures the two tight turns of route 1002 to comprise a larger turn radius around object 1004. For example, elastic band vectors 810 may be determined for each state point along the two tight turns, yielding the optimization 1008, as illustrated in FIG. 8B above. A larger turn radius, as illustrated above, reduces chance of a collision between robot 202 and objects 1004 as robot 202 executes the optimized segment 1008 of route 1002.

According to at least one non-limiting exemplary embodiment, a robot 202 may utilize one or more sensor units 214 to detect two objects 1004 are within a threshold distance on opposite sides of route 1002. Upon this detection, a controller 222 or processor 308 may execute computer readable instructions to map the narrow passageway on a computer readable map (e.g., as illustrated in FIG. 9D), perform an optimization 1008 to route 1002, and navigate robot 202 along the optimized portion 1008 of route 1002. This embodiment, however, may require the robot 202 to navigate nearby objects 1004 in order to detect a narrow passageway, which may further require robot 202 to backtrack along route 1002 and navigate an optimized portion 1008 of route 1002 to avoid colliding with objects 1004. This embodiment, on the other hand, does reduce computational complexity of detecting a narrow passageway, as opposed to the methods illustrated in the figures above using virtual robots and/or virtual extension of a footprint, such that narrow passageways may be detected in real time while the robot 202 is operating.

Figure 11:
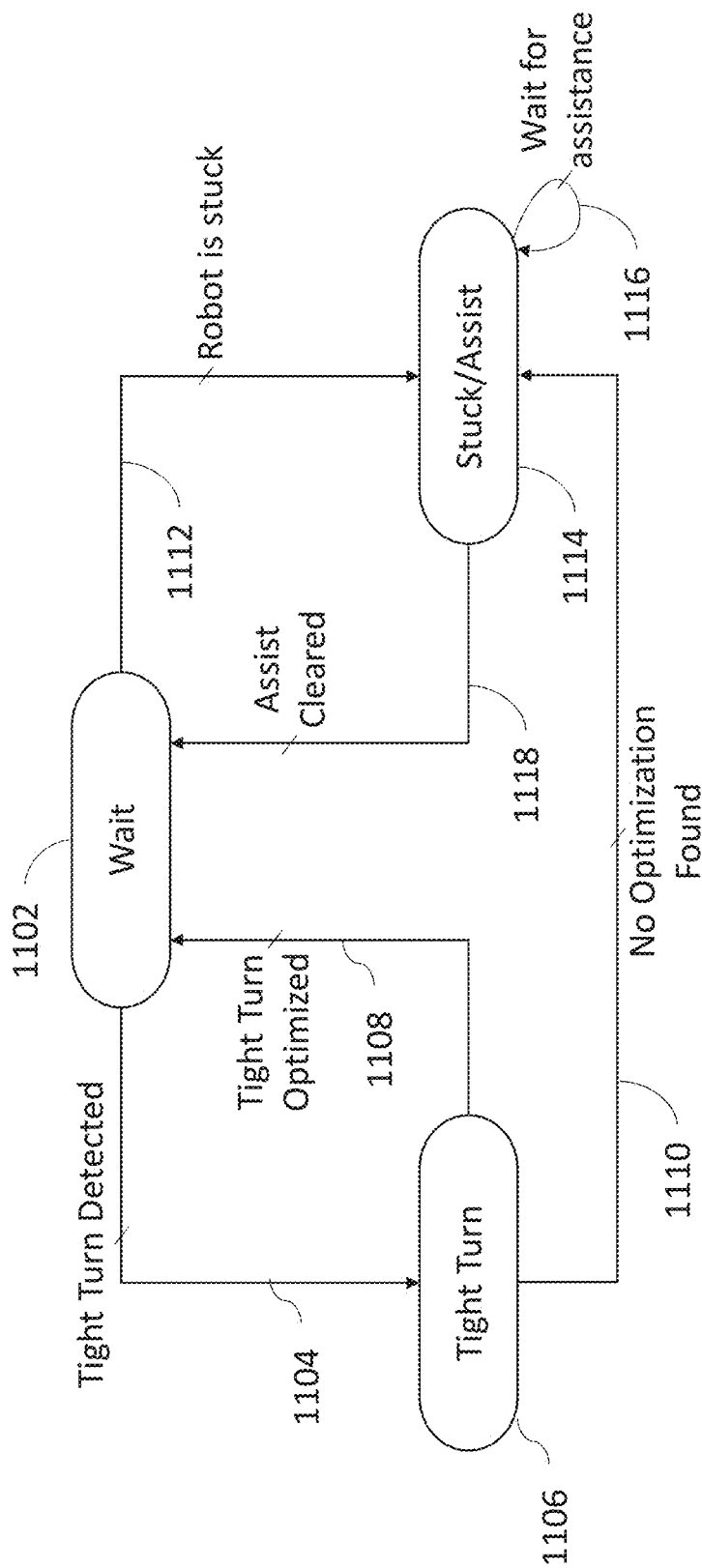
FIG. 11 is a state diagram illustrating various states for a controller or processor to optimize a route comprising a tight turn, according to an exemplary embodiment.

FIG. 11 is a state diagram illustrating three states of controller 222 or processor 308 during optimization of one or more segments or portions of a route, according to an exemplary embodiment. Starting with wait state 1102, the wait state 1102 may comprise any state of controller 222 or processor 308 when no optimizations are being performed to the route. For example, controller 222 or processor 308 may be in the wait state 1102 during navigation of the route far away from tight turns, during idle times of robot 202, or when robot 202 performs any other function of robot 202. As another example, controller 222 or processor 308 may be in the wait state 1102 as the controller 222 or processor 308 checks the route for tight turns and/or narrow passageways.

Condition 1104 comprises detection of a tight turn along the route. Condition 1104, in some embodiments, may also comprise detection of any turn into a narrow passageway. The controller 222 or processor 308 may execute computer readable instructions to detect a tight turn based on, for example, an angular rate of change of robot 202 during execution of the turn exceeding a threshold value. Tight turns may be determined prior to navigation of the route or during navigation of the route. Accordingly, the controller 222 or processor 308 may move to a tight turn state 1106.

While in the tight turn state 1106, controller 222 or processor 308 may execute computer readable instructions to optimize a portion of the route comprising the detected tight turn by elastic banding the portion, as illustrated in FIGS. 5, 6, 10 and 12. In other words, controller 222 or processor 308 may execute computer readable instructions to perform method 100, or portions thereof, of FIG. 1 above to optimize the portion of the route comprising the detected tight turn. Upon the portion of the route being optimized (i.e., elastic banded), condition 1108 may apply corresponding to completion of the optimization, wherein controller 222 or processor 308 may return to the wait state 1102. In some instances, no optimization may be determined (e.g., objects may block potential optimizations), wherein condition 1110 may configure controller 222 or processor 308 to move to a stuck/assist state 1114 described below.

While in the wait state 1102, the robot 202 may navigate the route or perform any other function of the robot 202. Controller 222 or processor 308 may execute computer readable instructions to, during navigation, determine if robot 202 becomes stuck (e.g., no navigable routes can be determined) or otherwise needs assistance from a human operator. Accordingly, controller 222 or processor 308 may move to a stuck/assist state 1114. While in the stuck/assist state 1114, robot 202 may be idle (i.e., stationary) and await assistance from an operator. Condition 1116 corresponds to the controller 222 or processor 308 awaiting assistance, e.g., from the human operator. Upon receiving assistance, condition 1118 may apply such that controller 222 or processor 308 returns to the wait state 1102, wherein condition 1118 corresponds to the robot 202 becoming unstuck and/or assistance being provided to robot 202 (e.g., an operator manually moving the robot 202 or moving objects blocking a path of robot 202).

It is appreciated that the three states 1102, 1106, and 1114 illustrated correspond to states of controller 222 or processor 308 required to perform optimizations to a route, wherein controller 222 or processor 308 may be in any of a plurality of additional states (e.g., an initialization state during powerup of robot 202, a cleaning state for a cleaning robot 202, etc.) to effectuate operations of robot 202 as appreciated by one skilled in the art.

Figure 12:
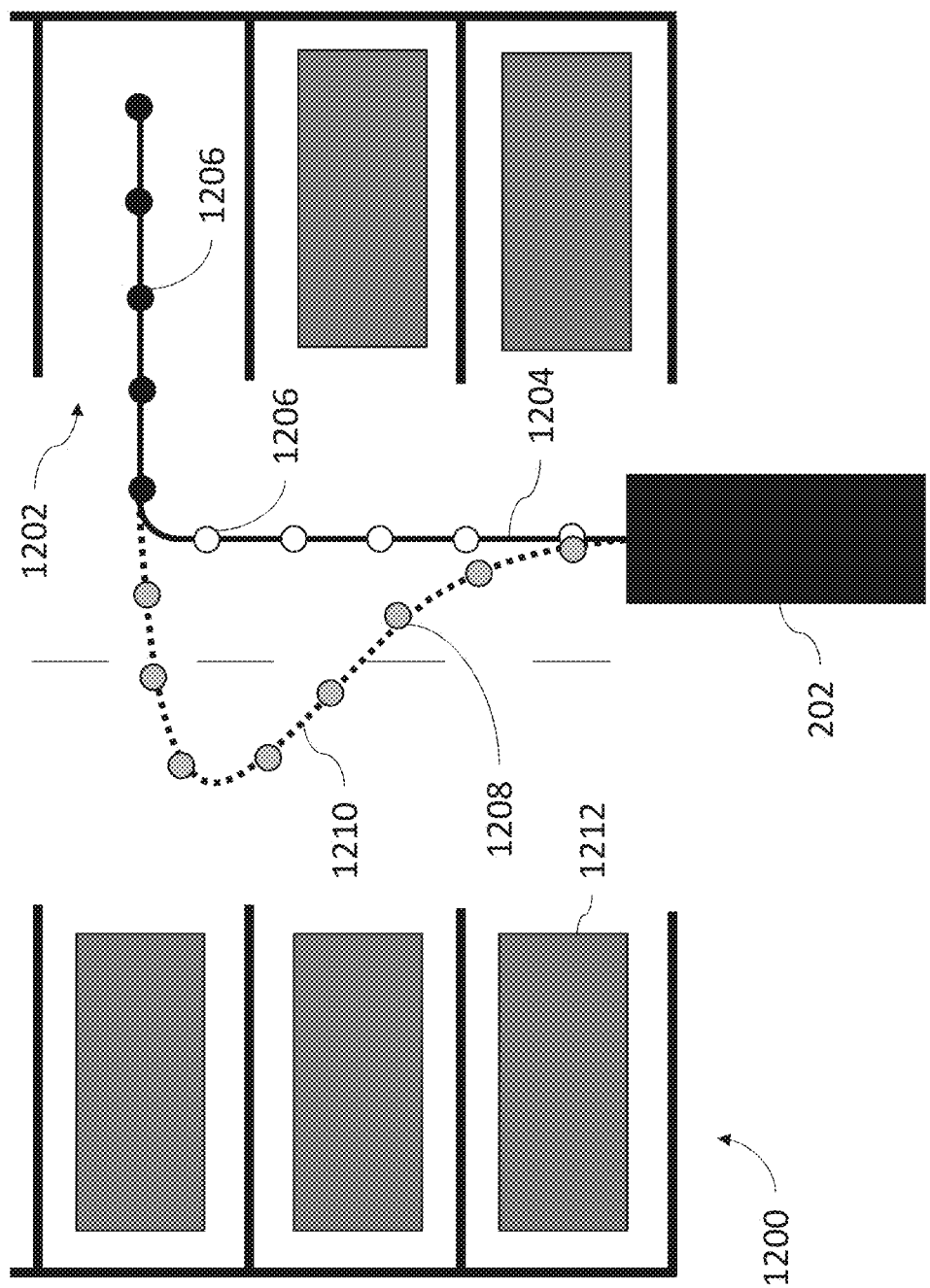
FIG. 12 is an implementation of the systems and methods of this disclosure for use in parking an autonomous vehicle in a tight parking space, according to an exemplary embodiment.

FIG. 12 illustrates an exemplary non-limiting implementation of the systems and methods of this disclosure for use in parking a robot 202, comprising a self-driving car, in a parking space 1202 in a parking lot 1200, according to an exemplary embodiment. Robot 202 may localize the objects 1212 and map them on a computer readable map of the parking lot 1200 using one or more operative units 204 illustrated in FIG. 2 above. Using the computer readable map, controller 222 or processor 308 of robot 202 may execute computer readable instructions to determine a first route 1204 comprising a shortest route into the available parking space 1202. The first route 1204 may, however, comprise a tight turn into a narrow passageway. Tight turns into a narrow passageway may cause collisions with nearby objects 1212, as illustrated in the above FIGS. 6 and 8A, or may cause robot 202 to become stuck, thereby requiring robot 202 to optimize at least a portion or segment of the first route 1204. As illustrated in FIG. 11 above, controller 222 or processor 308 may move to a tight turn state 1106 to determine an optimization 1210 to route 1204.

Route 1204 may comprise a plurality of state points 1206, each state point 1206 comprising state parameters (e.g., velocity, orientation, etc.) associated thereto. Robot 202 may navigate along the first route 1204 by configuring its state parameters to match state parameters of sequential state points 1206, as mentioned previously. Some state points 1206 may require optimization to avoid navigating robot 202 along a tight turn into a narrow passageway. Accordingly, state points 1206 illustrated in white are being optimized or otherwise changed, using systems and methods of this disclosure illustrated above, to state points 1208 illustrated in grey. It is appreciated that some additional state points 1208 are added to the optimized segment 1210 due to additional length added due to the optimization. That is, route 1204 is elastic banded to encompass a wider turn radius into the parking space 1202 such that robot 202 orients itself in a forward direction prior to entering the parking space 1202 and navigates further away from nearby objects 1212. The optimized segment 1210 may be similar or analogous to a human driving a car through a parking lot 1200 in a straight line (e.g., within a traffic lane), finding an available parking space 1202, and changing their current route (e.g., 1204) to encompass a wider turn (e.g., 1210) into a narrow parking space 1202 to avoid colliding with nearby parked cars 1212. It is appreciated that robot 202 may additionally verify that no cars are traveling in an opposite lane and/or in an opposite direction using sensor units 214 prior to navigating the optimized segment 1210 as the optimized segment 1210 encompasses, in part, navigation into another lane of traffic.

Although the systems and methods illustrated in the figures above utilize a plurality of state points to navigate a robot 202 along a trajectory or route, other contemporary methods for effectuating motion of a robot 202 along a trajectory are considered without limitation. For example, a robot 202 may plan its route using a cost map, wherein robot 202 will execute motions of lowest cost corresponding to motions which, without limitation, avoid objects (e.g., avoid overlap between risk areas 402 and objects on a computer readable map), navigate smoothly (i.e., avoid sharp turns), and navigate a shortest route. A cost map may comprise a cost function as a function of space, wherein regions of space comprising objects may have a high associated cost for a robot 202 to navigate over as compared to regions with no objects. As another example, a robot 202 may utilize precomputed motion primitives, comprising precomputed movements for the robot 202 to execute in accordance with a route. A plurality of other contemporary methods for effectuating control of a robot 202 along a route are considered. The broader systems and methods for elastic banding a portion or segment of a route to encompass a wider turn radius upon detection of a tight turn and/or a narrow passageway may be applied to any method of effectuating motion of a robot 202 without limitation as appreciated by one skilled in the art, wherein use of state points is intended to be illustrative. For example, a cost function of a cost map may encourage a robot 202 (e.g., by manipulating costs) to execute a wide turn around sharp corners and/or into narrow passageways.

Figure 13:
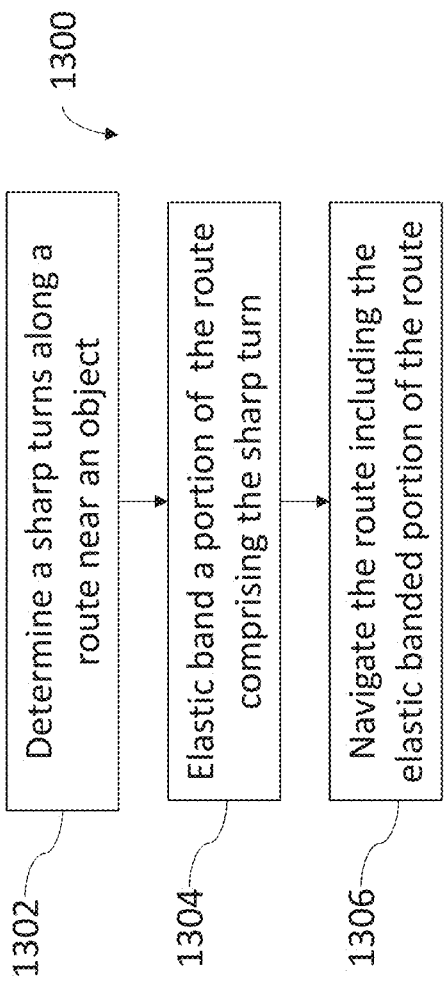
FIG. 13 is a process flow diagram illustrating a method for a controller or processor to optimize a route, according to an exemplary embodiment.

FIG. 13 is a process flow diagram illustrating a method 1300 for a controller 222 or processor 308 of a robot 202 to optimize a portion of a route using elastic banding, according to an exemplary embodiment.

Block 1302 comprises the controller 222 or processor 308 executing computer readable instructions to determine a sharp turn along a route, the sharp turn being near at least one object. The sharp turn may be detected by detecting an angular rate of change of the route over a distance along the route exceeding a threshold value. A sharp turn may alternatively or additionally be detected by projecting virtual robots along the route (e.g., at state points as illustrated in FIG. 8A) on a computer readable map, wherein a sharp turn may correspond to a footprint of one or more virtual robots overlapping with an object on the computer readable map during simulated navigation of the turn. It is appreciated that virtual robots comprise projections of the robot 202 onto the computer readable map, wherein the projection of the virtual robots is analogous to simulating navigation of the robot 202 along the route on the computer readable map.

Block 1304 comprises the controller 222 or processor 308 executing computer readable instructions to elastic band a portion of the route comprising the sharp turn. Elastic banding comprising expanding, stretching, or otherwise manipulating the portion of the route to encompass a wider turn radius around the at least one object. Exemplary embodiments of elastic banding of a route is illustrated above with respect to optimization route 504 of FIG. 5, optimization route 604 of FIG. 6, manipulating state points 806 as illustrated in FIG. 8B, optimization 1008 to route 1002 of FIG. 10, and route 1210 of FIG. 12. It is appreciated that other portions of the route near the sharp turn may also be manipulated, changed, or otherwise optimized to account for the changes to the portion comprising the sharp turn (e.g., to preserve continuity of the route, to ensure smooth movements of robot 202 along the now optimized route, etc.).

It is appreciated that determining the elastic banded portion of the route comprising the sharp turn may further comprise the controller 222 or processor 308 executing computer readable instructions to test a plurality of potential elastic banded portions of the route (i.e., potential optimizations to the portion of the route), wherein the determined elastic banded portion applied to the portion of the route comprising the sharp turn comprises a best optimization of the plurality of potential elastic banded portions. The best optimization being based on parameters including, but not limited to, distance added by the elastic banded portion, distance to nearby objects (e.g., in accordance with areas 402 of FIG. 4 above), rate of angular change along the elastic banded portion, and so forth.

Block 1306 comprises the controller 222 or processor 308 executing computer readable instructions to activate at least one actuator unit 208, illustrated in FIG. 2 above, and/or additional operative units 204 (e.g., navigation units 206) to navigate the robot 202 along the route, including the optimized portion. It is appreciated that method 1300 may be repeated to optimize (i.e., elastic band) every sharp turn near objects along the route prior to robot 202 navigating the route.

Figure 14:
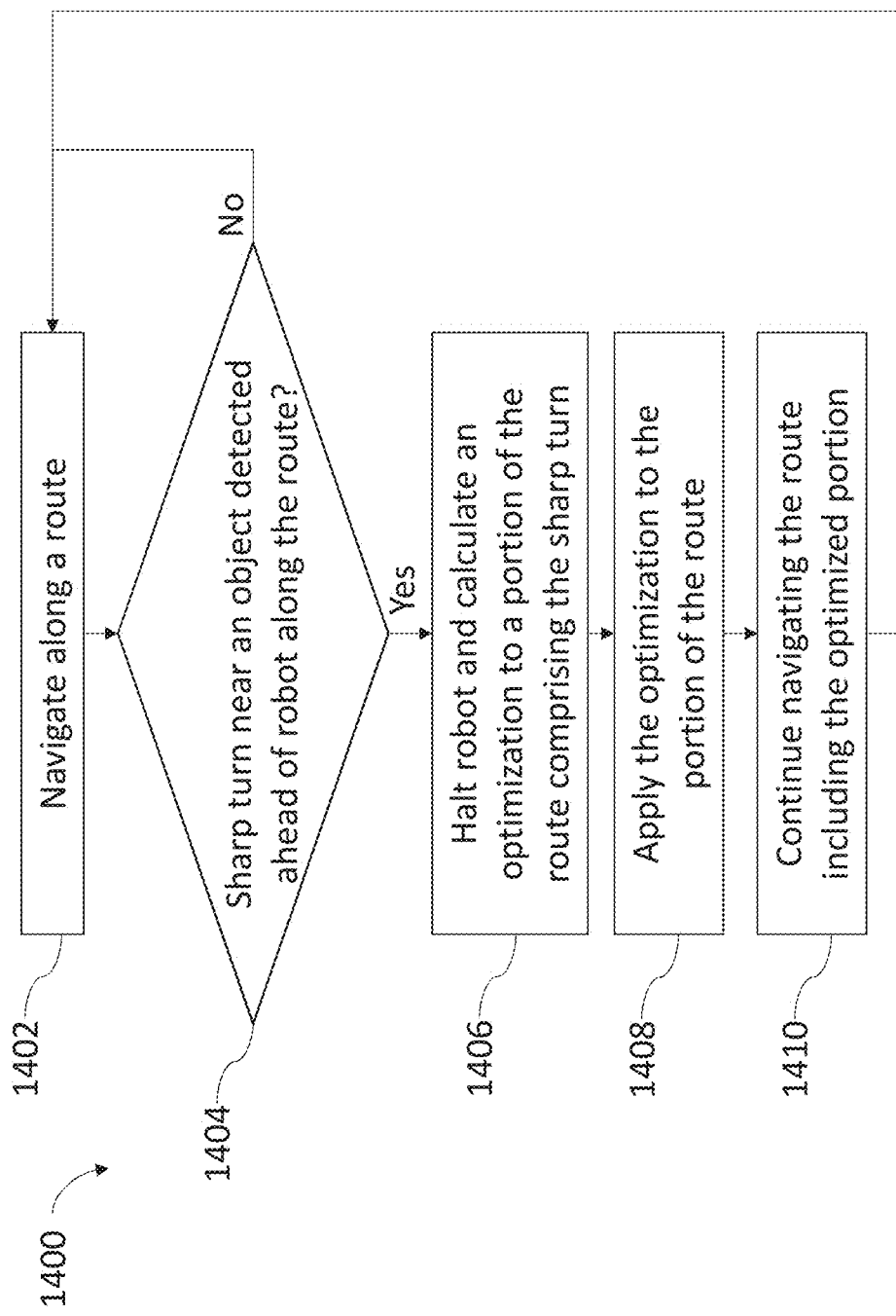
FIG. 14 is a process flow diagram for illustrating a method for a controller or processor optimizing a route during navigation of the route, according to an exemplary embodiment.

FIG. 14 is a process flow diagram illustrating a method 1400 for a controller 222 or processor 308 of robot 202 to avoid colliding with objects due to sharp turns and/or narrow passageways, according to an exemplary embodiment. Method 1400 may be performed during navigation of robot 202 along a route, the route comprising no optimizations prior to navigation of the route.

Block 1402 comprises the robot 202 navigating a route. The route may be a predetermined route, a learned route, a route calculated in real time by robot 202, or any other route. Navigation along the route is effectuated by controller 222 or processor 308 executing computer readable instructions to activate at least one operative unit 204 (e.g., actuator units 208) to move the robot 202 along the route.

Block 1404 comprises the controller 222 or processor 308 executing computer readable instructions to determine if a sharp turn near an object is present ahead of the robot along the route. The object being localized on a computer readable map. In some instances, multiple objects comprising a narrow passageway may be localized nearby the sharp turn. Sharp turns near an object may cause collisions, as illustrated in FIGS. 6 and 8A above. A sharp turn may be determined based on an angular rate of change of the route (e.g., velocity vectors 808 associated with the route illustrated in FIG. 8B) over a set distance exceeding a threshold value. The sharp turn may be detected by the controller 222 or processor 308 prior to the robot 202 navigating the sharp turn. As a non-limiting illustrative example, the controller 222 may evaluate 20 state points ahead of the robot 202, each separated by 0.5 meters, for sharp turns, thereby giving ample time for the robot 202 to stop and determine an optimization to the sharp turn portion of the route and/or halt if necessary. The objects may be within a threshold distance from the portion of the route comprising the sharp turn, the threshold distance being proportional to, at least, a width of robot 202 and turn radius of robot 202.

Upon controller 222 or processor 308 determining a sharp turn is detected ahead of robot 202 along the route and nearby an object, controller 222 or processor 308 may move to block 1406.

Upon controller 222 or processor 308 determining no sharp turn ahead of robot 202 along the route, controller 222 or processor 308 may return to block 1402 and continue to navigate robot 202 along the route.

Block 1406 comprises the controller 222 or processor 308 executing computer readable instructions to halt the robot 202 and calculate an optimization to a portion of the route comprising the sharp turn. In some embodiments, controller 222 or processor 308 may comprise computing capabilities to calculate an optimization sufficiently fast, such that halting of the robot 202 is not necessary. In some embodiments, controller 222 or processor may execute computer readable instructions to reduce a speed of the robot 202. Halting of the robot 202, however, may still be implemented, for example, as a safety measure. Controller 222 or processor 308 may execute method 100 and/or 1300 described in FIGS. 1 and 13, respectively, above to determine an optimization to the portion of the route comprising the sharp turn.

Block 1408 comprises the controller 222 or processor 308 executing computer readable instructions to apply the optimization to the route, determined in block 1406, to the portion of the route comprising the sharp turn. The optimization corresponding to elastic banding a portion of the route comprising the sharp turn, wherein the elastic banding may further change portions of the route nearby the sharp turn portion as illustrated above in FIG. 8B.

Block 1410 comprises the controller 222 or processor 308 executing computer readable instructions to navigate the robot 202 along the route, including the optimized portion. Controller 222 or processor 308 may return to block 1402 upon navigating past the optimized portion.

The present disclosure illustrates a robotic system comprising a non-transitory memory having computer readable instructions stored therein and at least one processor configured to execute the computer readable instructions to determine a first route based on optimizing a predetermined second route prior to the robotic system traveling the first route, the optimizing being based on a plurality of characteristics independent of each other, and the first route is determined from at least one possible route to optimize the second route. The at least one processor may be further configured to superimpose footprints of at least one virtual robot on a computer readable map to test the at least one possible route to determine the first route, wherein the at least one virtual robot footprints comprise a footprint indicative of future positions of the robotic system on the computer readable map. Testing the at least one possible route may comprise determining collision points along the at least one possible route, wherein a collision point is determined where a footprint of the at least one virtual robot intersects an environment obstacle on the computer readable map. The at least one processor may be further configured to determine on a degree of risk associated with each of the at least one possible route, wherein a higher degree of risk corresponds to the robotic system maneuvering closer to an environment obstacle and vice versa, wherein the at least one possible route further comprises elastic banding the second route, wherein elastic banding comprises extending the second route around an obstacle such that the elastic banded second route encompasses a wider turn around the obstacle. The at least one processor may be further configured to apply the first route by changing data stored in the memory comprising the second route. The at least one processor may be further configured to modify at least one state point along the second route to account for an optimization made by the first route, wherein the modifications comprise adding, removing, and repositioning the at least one state point and modifying a state corresponding to the at least one state point.

The present disclosure additionally describes a plurality of instructions stored on a non-transitory computer readable storage medium, the instructions, when executed by a specialized processor, cause the specialized processor to determine a first route based on optimizing a predetermined second route prior to the robotic system traveling the first route, the optimizing being based on a plurality of characteristics independent of each other, and the first route is determined from at least one possible route to optimize the second route. The instructions may further cause the specialized processor to superimpose footprints of at least one virtual robot on a computer readable map to test the at least one possible route to determine the first route, wherein the at least one virtual robot footprints comprise a footprint indicative of future positions of the robotic system on the computer readable map. Testing the at least one possible route may comprise determining collision points along the at least one possible route, wherein a collision point is determined where a footprint of the at least one virtual robot intersects an environment obstacle on the computer readable map. The instructions may further cause the specialized processor to determine a degree of risk associated with each of the at least one possible route, wherein a higher degree of risk corresponds to the robotic system maneuvering closer to an environment obstacle and vice versa. The at least one possible route may further comprise elastic banding the second route, wherein elastic banding comprises extending the second route around an obstacle such that the elastic banded second route encompasses a wider turn around the obstacle. The instructions may further cause the specialized processor to apply the first route by changing data stored in the non-transitory computer readable storage medium comprising the second route. The instructions may further cause the specialized processor to modify at least one state point along the second route to account for an optimization made by the first route, wherein the modifications comprise adding, removing, and repositioning the at least one state point and modifying a state corresponding to the at least one state point.

The present disclosure additionally illustrates a method for optimizing route planning methods for a robotic system comprising determining a first route based on optimizing a predetermined second route prior to the robotic system traveling the first route, the optimizing being based on a plurality of characteristics independent of each other, and the first route is determined from at least one possible route to optimize the second route. The method may further comprise superimposing footprints of at least one virtual robot on a computer readable map to test the at least one possible route to determine the first route, wherein the at least one virtual robot footprints comprise a footprint indicative of future positions of the robotic system on the computer readable map. The method may further comprise determining a degree of risk associated with each of the at least one possible route, wherein a higher degree of risk corresponds to the robotic system maneuvering closer to an environment obstacle and vice versa. The at least one possible route may further comprise elastic banding the second route, wherein elastic banding comprises extending the second route around an obstacle such that the elastic banded second route encompasses a wider turn around the obstacle. The method may further comprise modifying at least one state point along the second route to account for an optimization made by the first route, wherein the modifications comprise adding, removing, and repositioning the at least one state point and modifying a state corresponding to the at least one state point.

The present disclosure additionally illustrates a robotic system capable of determining narrow passageways, the robotic system comprising a non-transitory memory having computer readable instructions stored thereon and at least one processor configured to execute the instructions, causing the processor to: extend the footprint of the robotic system on a first side and a second side, the first and second sides being perpendicular to the forward direction of the robot; navigate the route and determine locations of environment obstacles detected within the extended footprints; and determine a narrow passageway where at least one pair of obstacles are detected on both the first and second sides of the robotic system along a cross-sectional plane perpendicular to the forward direction of the robotic system. The processor may be further configured to use a virtual robot with an extended footprint in place of the robotic system to navigate the route and detect obstacles to determine a narrow passageway along the route.

Lastly, the present disclosure additionally illustrates a method for a robotic system to determine a narrow passageway along a route, using at least one processor executing instructions stored on a non-transitory computer readable storage medium, by: extending the footprint of the robotic system on a first side and a second side, the first and second sides being perpendicular to the forward direction of the robot; navigating the route and determine locations of environment obstacles detected within the extended footprints; and determining a narrow passageway where at least one pair of obstacles are detected on both the first and second sides of the robotic system along a cross-sectional plane perpendicular to the forward direction of the robotic system. The method may further comprise using a virtual robot with an extended footprint in place of the robotic system to navigate the route and detect obstacles to determine a narrow passageway along the route.

The present disclosure illustrates a robotic system comprising at least one sensor configured to transmit information related to an environment of the robotic system, a non-transitory computer-readable memory comprising a plurality of instructions stored therein, and at least one processor configured to execute the computer-readable instructions to, receive a map of the environment comprising the location of at least one obstacle and route to navigate, the route comprising a plurality of route segments; determine a route segment, of the plurality of route segments, comprises a tight turn, narrow passageway, or tight turn into a narrow passageway, wherein at least one possible collision point is determined. Further, the at least one processor is further configured to execute the computer readable instructions to determine at least one possible optimization to the route segment; generate at least one virtual robot to test the at least one optimization for possible collision points; determine a found optimization out of the at least one possible optimization, wherein the found optimization meets or exceeds an optimization threshold; apply the found optimization to the route by changing data stored in memory comprising the route; and navigate the optimized route by activating at least one actuator, the at least one actuator configured to move the robotic system.

The at least one processor may further be configured to superimpose footprints of at least one virtual robot on a computer readable map to test the at least one possible optimization of a segment of the route, wherein the virtual robot footprints comprise a footprint indicative of future possible positions of the robotic apparatus on the computer readable map, wherein testing the at least one possible optimization comprises determining collision points along the at least one possible optimization, wherein a collision point is determined where a footprint, of the at least one virtual robot, intersects an environment obstacle on the computer readable map. The at least one processor may be further configured to determine a degree of risk associated with each of the at least one possible optimizations, wherein a higher degree of risk corresponds to the robotic apparatus maneuvering closer to an environment obstacle and vice versa. The at least one optimizations may further comprise elastic banding the segment of route, wherein elastic banding comprises extending the segment around an obstacle such that the elastic banded segment encompasses a wider turn around an obstacle. The at least one specialized processor may be further configured to determine a route segment, of the plurality of route segments, comprising a high degree of risk maneuver, wherein optimizations are made to the route segment to minimize the degree of risk. The at least one processor may be further configured to modify at least one state point along the route to account for an optimization made to the route, wherein the modifications comprise adding, removing, and repositioning the at least one state point and modifying a state corresponding to the at least one state point.

The present disclosure further describes a plurality of instructions stored on a non-transitory computer-readable storage medium, the instructions, when executed by one or more processors, cause the one or more processors to: receive a map of the environment comprising the location of at least one obstacle and route to navigate, the route comprising a plurality of route segments; determine a route segment, of the plurality of route segments, comprises a tight turn, narrow passageway, or tight turn into a narrow passageway wherein at least one possible collision point is determined; determine at least one possible optimization to the route segment to avoid the at least one collision point; determine a found optimization of the at least one possible optimizations, wherein the found optimization meets an optimization threshold; and apply the found optimization to the route segment by changing data, stored in the non-transitory computer readable storage medium, comprising the route. The non-transitory computer readable storage medium may further comprise instructions to determine a tight turn along the route based on a turning threshold being met or exceeded, the threshold comprising an allowable degree of turning within a set distance.

The non-transitory computer readable storage medium may further comprise instructions to utilize at least one virtual robot footprint to determine collision points along the at least one possible optimizations to the route segment based on the intersection of the footprint and an environment obstacle on the computer readable map. The non-transitory computer readable storage medium may further comprise instructions to determine the best optimization of the at least one possible optimization is based on minimizing length of the optimization while simultaneously minimizing degree of risk and eliminating collision points. The optimizations applied to a route may be performed by modifying route data, the route data comprising positional coordinates on the computer readable map corresponding to distances along the route.

The present disclosure may further provide a method for a robotic apparatus to detect narrow passageways along a route, using at least one processor executing instructions on a non-transitory computer-readable storage medium, by: extending the footprint of the robotic apparatus on a first side, the side being perpendicular to the forward direction of the robot; navigating a route and determine locations of environment obstacles; repeating above for a second side, opposite the first side; and determining a narrow passageway where at least one pair of obstacles are detected on both sides of the robotic apparatus along a cross-sectional plane perpendicular to the forward direction of the robotic apparatus. The method may further comprise using a virtual robot with an extended footprint in place of the robotic apparatus to navigate a route and detect obstacles to determine the narrow passageway along the route.

The present disclosure may further provide a method for optimizing route planning methods of a robotic apparatus comprising: determining a segment of a route, the route comprising a plurality of segments, wherein the segment comprises a sharp turn, narrow passageway, or sharp turn into a narrow passageway; determining at least one possible optimizations to the route segment; testing the at least one possible optimization using at least one virtual robot to determine if the at least one possible optimization meets an optimization threshold; and applying a found optimization, of the at least one possible optimization, to the route segment, wherein the found optimization meets the optimization threshold. The method may further comprise identifying a tight turn along a segment of route is based on a set threshold being met or exceeded, the threshold comprising maximum degree of turning within a set distance. The method may further comprise generating at least one virtual robot footprint, used to determine collision points along and the degree of risk of the at least one possible optimizations based on the intersection of the footprint and an environment obstacle on a computer readable map. The method may further comprise determining the found optimization, of the at least one possible optimization, is based on the found optimization meeting a prescribed optimization threshold. The method may further comprise applying the found optimization to the route by modifying route data, the route data comprising positional coordinates on the computer readable map corresponding to distances along the route.

It will be recognized that, while certain aspects of the disclosure are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure, and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, un-recited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning, should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein, "defined" or "determined" may include "predefined" or "predetermined" and/or otherwise determined values, conditions, thresholds, measurements, and the like.

What is claimed is:

1. A robotic system comprising:
   a memory comprising computer readable instructions stored thereon; and
   at least one processor configured to execute the computer readable instructions to:
      determine a first route based at least in part on a change to a segment of a second route prior to the robotic system traveling the first route, the segment of the second route comprising a tight turn, the change to the segment of the second route being based at least in part on detecting the tight turn in the segment, the first route being determined from one or more possible routes comprising the change to the segment of the second route, wherein each of the one or more possible routes comprises an elastic banded segment, the elastic banded segment comprising the segment of the second route elastically banded by increasing a length of the segment of the second route in a direction away from the tight turn to define a widened turn comprising a turn radius wider than a turn radius of the tight turn of the segment of the second route,
   wherein the second route comprises a route navigated by the robotic system under user guided control and the first route comprises a route navigated by the robotic system autonomously,
   the first route, the second route, and the segment of the second route each comprise a plurality of state points, and
   the state points of the second route outside of the segment of the second route are not modified and form, at least in part, the first route,
   wherein the tight turn comprises an overlap between at least a portion of a lateral buffer zone of an extended footprint of the robotic system and an object on a computer readable map that occurs during execution of a turn in the segment of the second route by the robotic system, the lateral buffer zone comprising regions along opposing lateral sides of the robotic system extending beyond a footprint of the robotic system, the footprint comprising a two-dimensional area of the robotic system on the computer readable map.

2. The robotic system of claim 1, wherein the at least one processor is further configured to execute the computer readable instructions to:
   superimpose a plurality of footprints of at least one virtual robotic system on the computer readable map to determine the first route, wherein each of the plurality of footprints comprises a footprint indicative of a predicted position of the robotic system on the computer readable map along the first route.

3. The robotic system of claim 2, wherein the at least one processor is further configured to execute the computer readable instructions to:
determine one or more collision points along each of the one or more possible routes, wherein a respective collision point is determined based on at least a portion of a respective footprint of the plurality of footprints of the at least one virtual robotic system intersecting or overlapping with one of the object or another object on the computer readable map.

4. The robotic system of claim 2, wherein the at least one processor is further configured to execute the computer readable instructions to:
determine a degree of risk associated with each of the one or more possible routes, wherein a higher degree of risk corresponds to a respective possible route that causes the robotic system to maneuver closer to the object, and a lower degree of risk corresponds to a respective possible route that causes the robotic system to maneuver further away from the object.

5. The system of claim 2, wherein the at least one processor is further configured to execute the computer readable instructions to:
determine the first route upon detecting a narrow passageway along the segment of the second route, wherein detecting the narrow passageway comprises:
detecting the tight turn on a first lateral side of the opposing lateral sides of the robotic system; and
detecting an intersection between a second object and the lateral buffer zone on a second later side of the opposing lateral sides of the robotic system opposite the first lateral side.

6. The robotic system of claim 1, wherein the at least one processor is further configured to execute the computer readable instructions to:
navigate the robotic system along the elastic banded segment of the second route, wherein the elastic banded segment of the second route comprises a narrow passageway; and
orient the robotic system in a forward direction relative to the narrow passageway prior to entering the narrow passageway.

7. The robotic system of claim 1, wherein the at least one processor is further configured to execute the computer readable instructions to:
modify at least one state point along the second route by at least one of adding, removing, and repositioning the at least one state point, wherein the at least one state point corresponds to the change made to the segment of the second route; and
modify one or more state parameters corresponding to the at least one state point.

8. A non-transitory computer readable storage medium comprising a plurality of computer readable instructions embodied thereon, which when executed by one or more processors, configure the one or more processors to:
determine a first route based at least in part on a change to a segment of a second route prior to a robotic system traveling the first route, the segment of the second route comprising a tight turn, the change to of the segment of the second route being based at least in part on detecting the tight turn in the segment, the first route being determined from one or more possible routes comprising the change to the segment of the second route, wherein each of the one or more possible routes comprises an elastic banded segment, the elastic banded segment comprising the segment of the second route elastically banded by increasing a length of the segment of the second route in a direction away from the tight turn to define a widened turn comprising a turn radius wider than a turn radius of the tight turn of the segment of the second route,
wherein the second route comprises a route navigated by the robotic system under user guided control and the first route comprises a route navigated by the robotic system autonomously,
the first route, the second route, and the segment of the second route each comprise a plurality of state points, and
the state points of the second route outside of the segment of the second route are not modified and form, at least in part, the first route, and
wherein the tight turn comprises an overlap between at least a portion of a lateral buffer zone of an extended footprint of the robotic system and an object on a computer readable map that occurs during execution of a turn in the segment of the second route by the robotic system, the lateral buffer zone comprising regions along opposing lateral sides of the robotic system extending beyond a footprint of the robotic system, the footprint comprising a two-dimensional area of the robotic system on the computer readable map.

9. The non-transitory computer readable storage medium of claim 8, wherein the one or more processors are further configured to execute the computer readable instructions to:
superimpose a plurality of footprints of at least one virtual robotic system on the computer readable map to determine the first route, wherein each of the plurality of footprints comprises a footprint indicative of a predicted position of the robotic system on the computer readable map along the first route.

10. The non-transitory computer readable storage medium of claim 9, wherein the one or more processors are further configured to execute the computer readable instructions to:
determine collision points along each of the one or more possible routes, wherein a respective collision point is determined based on at least a portion of a respective footprint of the plurality of footprints of the at least one virtual robotic system intersecting or overlapping with one of the object or another object on the computer readable map.

11. The non-transitory computer readable storage medium of claim 9, wherein the one or more processors are further configured to execute the computer readable instructions to:
determine a degree of risk associated with each of the one or more possible routes, wherein a higher degree of risk corresponds to a possible route that causes the robotic system to maneuver closer to the object, and a lower degree of risk corresponds to a possible route that causes the robotic system to maneuver further away from the object.

12. The non-transitory computer readable storage medium of claim 9, wherein the one or more processors are further configured to execute the computer readable instructions to;
determine the first route upon detecting a narrow passageway along the segment of the second route, wherein detecting the narrow passageway comprises:
detecting the tight turn on a first lateral side of the opposing lateral sides of the robotic system; and
detecting an intersection between a second object and the lateral buffer zone on a second later side of the opposing lateral sides of the robotic system opposite the first lateral side.

13. The non-transitory computer readable storage medium of claim 8, wherein the one or more processors are further configured to execute the computer readable instructions to,
  navigate the robotic system along the elastic banded segment of the second route, wherein the elastic banded segment of the second route comprises a narrow passageway; and
  orient the robotic system in a forward direction relative to the narrow passageway prior to entering the narrow passageway.

14. The non-transitory computer readable storage medium of claim 8, wherein the one or more processors are further configured to execute the computer readable instructions to:
  modify at least one state point along the second route by adding, removing, or repositioning the at least one state point, wherein the at least one state point corresponds to the change made to the segment of the second route; and
  modify one or more state parameters corresponding to the at least one state point.

15. A method for route planning for a robotic system, comprising:
  determining a first route based at least in part on a change to a segment of a second route prior to the robotic system traveling the first route, the segment of the second route comprising a tight turn, the change of the segment of the second route being based at least in part on detecting the tight turn in the segment, the first route being determined from one or more possible routes comprising the change to the segment of the second route, wherein each of the one or more possible routes comprises an elastic banded segment, the elastic banded segment comprising the segment of the second route elastically banded by increasing a length of the segment of the second route in a direction away from the tight turn to define a widened turn comprising a turn radius wider than a turn radius of the turn of the tight turn of the segment of the second route,
  wherein,
    the second route comprises a route navigated by the robotic system under user guided control and the first route comprises a route navigated by the robotic system autonomously,
    the first route, the second route, and the segment of the second route each comprise a plurality of state points, and
    the state points of the second route outside of the segment of the second route are not modified and form, at least in part, the first route, and
    the tight turn comprises an overlap between at least a portion of a lateral buffer zone of an extended footprint of the robotic system and an object on a computer readable map that occurs during execution of a turn in the segment of the second route by the robotic system, the lateral buffer zone comprising regions along opposing lateral sides of the robotic system extending beyond a footprint of the robotic system, the footprint comprising a two-dimensional area of the robotic system on the computer readable map.

16. The method of claim 15, further comprising:
superimposing a plurality of footprints of at least one virtual robotic system on the computer readable map to determine the first route, wherein each of the plurality of footprints comprises a footprint indicative of a predicted position of the robotic system on the computer readable map along the first route.

17. The method of claim 16, further comprising:
determining collision points along each of the one or more possible routes, wherein a respective collision point is determined based on at least a portion of a respective footprint of the plurality of footprints of the at least one virtual robotic system intersecting or overlapping with one of the object or another object on the computer readable map.

18. The method of claim 16, further comprising:
determining a degree of risk associated with each of the one or more possible routes, wherein a higher degree of risk corresponds to a possible route that causes the robotic system to maneuver closer to the object, and a lower degree of risk corresponds to a possible route that causes the robotic system to maneuver further away from the object.

19. The method of claim 16, further comprising:
determining the first route upon detecting a narrow passageway along the segment of the second route, wherein detecting the narrow passageway comprises:
  detecting the tight turn on a first lateral side of the opposing lateral sides of the robotic system; and
  detecting an intersection between a second object and the lateral buffer zone on a second later side of the opposing lateral sides of the robotic system opposite the first lateral side.

20. The method of claim 15, further comprising:
navigating along the elastic banded segment of the second route, wherein the elastic banded segment of the second route comprises a narrow passageway; and
orienting the robotic system in a forward direction relative to the narrow passageway prior to entering the narrow passageway.

* * * * *